United States Patent
Sommerlade et al.

(10) Patent No.: US 11,854,243 B2
(45) Date of Patent: *Dec. 26, 2023

(54) GAZE CORRECTION OF MULTI-VIEW IMAGES

(71) Applicant: RealD Spark, LLC, Beverly Hills, CA (US)

(72) Inventors: Eric Sommerlade, Oxford (GB); Michael G. Robinson, Boulder, CO (US)

(73) Assignee: RealD Spark, LLC, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/703,039

(22) Filed: Mar. 24, 2022

(65) Prior Publication Data
US 2022/0400246 A1    Dec. 15, 2022

Related U.S. Application Data

(63) Continuation of application No. 16/937,382, filed on Jul. 23, 2020, now Pat. No. 11,317,081, which is a
(Continued)

(51) Int. Cl.
*H04N 7/14*     (2006.01)
*G06V 10/62*    (2022.01)
(Continued)

(52) U.S. Cl.
CPC .............. *G06V 10/62* (2022.01); *G06F 3/011* (2013.01); *G06F 3/013* (2013.01); *G06V 10/462* (2022.01);
(Continued)

(58) Field of Classification Search
CPC .... G06V 10/62; G06V 10/462; G06V 40/193; G06F 3/011; G06F 3/013; H04N 7/147; H04N 7/15; H04N 13/344; H04N 13/117
(Continued)

(56) References Cited

U.S. PATENT DOCUMENTS 1,128,979 A    2/1915   Hess
1,970,311 A    8/1934   Ives
(Continued)

FOREIGN PATENT DOCUMENTS

CN    1142869 A    2/1997
CN    1377453 A    10/2002
(Continued)

OTHER PUBLICATIONS

3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%
3M™ ePrivacy Filter software professional version; http://www.cdw.com/shop/products/3M-ePrivacy-Filter-software-professional-version/3239412.aspx?cm_mmc=ShoppingFeeds-_-ChannelIntelligence-_-Software-_-3239412_3MT%20ePrivacy%20Filter%20software%20professional%20version_3MF-.
(Continued)

*Primary Examiner* — Gims S Philippe
(74) *Attorney, Agent, or Firm* — Penny L. Lowry

(57) ABSTRACT

Gaze is corrected by adjusting multi-view images of a head. Image patches containing the left and right eyes of the head are identified and a feature vector is derived from plural local image descriptors of the image patch in at least one image of the multi-view images. A displacement vector field representing a transformation of an image patch is derived, using the derived feature vector to look up reference data comprising reference displacement vector fields associated with possible values of the feature vector produced by machine learning. The multi-view images are adjusted by transforming the image patches containing the left and right eyes of the head in accordance with the derived displacement vector field.

20 Claims, 7 Drawing Sheets

Related U.S. Application Data continuation of application No. 16/405,415, filed on May 7, 2019, now Pat. No. 10,750,160, which is a continuation of application No. 15/397,951, filed on Jan. 4, 2017, now Pat. No. 10,321,123.

(60) Provisional application No. 62/274,897, filed on Jan. 5, 2016.

(51) Int. Cl.
| | | |
|---|---|---|
| *G06F 3/01* | (2006.01) | |
| *H04N 7/15* | (2006.01) | |
| *G06V 10/46* | (2022.01) | |
| *G06V 40/18* | (2022.01) | |
| *H04N 13/344* | (2018.01) | |
| *H04N 13/117* | (2018.01) | |

(52) U.S. Cl.
CPC .......... *G06V 40/193* (2022.01); *H04N 7/147* (2013.01); *H04N 7/15* (2013.01); *H04N 13/344* (2018.05); *H04N 13/117* (2018.05)

(58) Field of Classification Search
USPC ........................................................ 348/53
See application file for complete search history.

(56) References Cited

U.S. PATENT DOCUMENTS

| | | |
|---|---|---|
| 2,133,121 A | 10/1938 | Stearns |
| 2,247,969 A | 7/1941 | Stewart |
| 2,480,178 A | 8/1949 | Zinberg |
| 2,810,905 A | 10/1957 | Barlow |
| 3,409,351 A | 11/1968 | Winnek |
| 3,715,154 A | 2/1973 | Bestenreiner |
| 4,057,323 A | 11/1977 | Ward |
| 4,528,617 A | 7/1985 | Blackington |
| 4,542,958 A | 9/1985 | Young |
| 4,804,253 A | 2/1989 | Stewart |
| 4,807,978 A | 2/1989 | Grinberg et al. |
| 4,829,365 A | 5/1989 | Eichenlaub |
| 4,914,553 A | 4/1990 | Hamada et al. |
| 5,050,946 A | 9/1991 | Hathaway et al. |
| 5,278,608 A | 1/1994 | Taylor et al. |
| 5,347,644 A | 9/1994 | Sedlmayr |
| 5,349,419 A | 9/1994 | Taguchi et al. |
| 5,459,592 A | 10/1995 | Shibatani et al. |
| 5,466,926 A | 11/1995 | Sasano et al. |
| 5,499,303 A | 3/1996 | Hundt et al. |
| 5,510,831 A | 4/1996 | Mayhew |
| 5,528,720 A | 6/1996 | Winston et al. |
| 5,581,402 A | 12/1996 | Taylor |
| 5,588,526 A | 12/1996 | Fantone et al. |
| 5,697,006 A | 12/1997 | Taguchi et al. |
| 5,703,667 A | 12/1997 | Ochiai |
| 5,727,107 A | 3/1998 | Umemoto et al. |
| 5,771,066 A | 6/1998 | Barnea |
| 5,796,451 A | 8/1998 | Kim |
| 5,808,792 A | 9/1998 | Woodgate et al. |
| 5,875,055 A | 2/1999 | Morishima et al. |
| 5,896,225 A | 4/1999 | Chikazawa |
| 5,903,388 A | 5/1999 | Sedlmayr |
| 5,933,276 A | 8/1999 | Magee |
| 5,956,001 A | 9/1999 | Sumida et al. |
| 5,959,664 A | 9/1999 | Woodgate |
| 5,969,850 A | 10/1999 | Harrold et al. |
| 5,971,559 A | 10/1999 | Ishikawa et al. |
| 6,008,484 A | 12/1999 | Woodgate et al. |
| 6,014,164 A | 1/2000 | Woodgate et al. |
| 6,023,315 A | 2/2000 | Harrold et al. |
| 6,055,013 A | 4/2000 | Woodgate et al. |
| 6,061,179 A | 5/2000 | Inoguchi et al. |
| 6,061,489 A | 5/2000 | Ezra et al. |
| 6,064,424 A | 5/2000 | Berkel et al. |
| 6,075,557 A | 6/2000 | Holliman et al. |
| 6,094,216 A | 7/2000 | Taniguchi et al. |
| 6,108,059 A | 8/2000 | Yang |
| 6,118,584 A | 9/2000 | Berkel et al. |
| 6,128,054 A | 10/2000 | Schwarzenberger |
| 6,172,723 B1 | 1/2001 | Inoue et al. |
| 6,199,995 B1 | 3/2001 | Umemoto et al. |
| 6,224,214 B1 | 5/2001 | Martin et al. |
| 6,232,592 B1 | 5/2001 | Sugiyama |
| 6,256,447 B1 | 7/2001 | Laine |
| 6,262,786 B1 | 7/2001 | Perlo et al. |
| 6,283,858 B1 | 9/2001 | Hayes, Jr. et al. |
| 6,295,109 B1 | 9/2001 | Kubo et al. |
| 6,302,541 B1 | 10/2001 | Grossmann |
| 6,305,813 B1 | 10/2001 | Lekson et al. |
| 6,373,637 B1 | 4/2002 | Gulick et al. |
| 6,377,295 B1 | 4/2002 | Woodgate et al. |
| 6,422,713 B1 | 7/2002 | Fohl et al. |
| 6,456,340 B1 | 9/2002 | Margulis |
| 6,464,365 B1 | 10/2002 | Gunn et al. |
| 6,476,850 B1 | 11/2002 | Erbey |
| 6,556,196 B1 | 4/2003 | Blanz et al. |
| 6,654,156 B1 | 11/2003 | Crossland et al. |
| 6,663,254 B2 | 12/2003 | Ohsumi |
| 6,677,980 B1 | 1/2004 | Jeon |
| 6,724,452 B1 | 4/2004 | Takeda et al. |
| 6,731,355 B2 | 5/2004 | Miyashita |
| 6,736,512 B2 | 5/2004 | Balogh |
| 6,798,406 B1 | 9/2004 | Jones et al. |
| 6,801,243 B1 | 10/2004 | Berkel |
| 6,806,898 B1 | 10/2004 | Toyama et al. |
| 6,816,158 B1 | 11/2004 | Lemelson et al. |
| 6,825,985 B2 | 11/2004 | Brown et al. |
| 6,847,488 B2 | 1/2005 | Travis |
| 6,859,240 B1 | 2/2005 | Brown et al. |
| 6,867,828 B2 | 3/2005 | Taira et al. |
| 6,919,892 B1 | 7/2005 | Cheiky et al. |
| 6,975,755 B1 | 12/2005 | Baumberg |
| 7,001,058 B2 | 2/2006 | Inditsky |
| 7,058,252 B2 | 6/2006 | Woodgate et al. |
| 7,091,931 B2 | 8/2006 | Yoon |
| 7,101,048 B2 | 9/2006 | Travis |
| 7,136,031 B2 | 11/2006 | Lee et al. |
| 7,215,391 B2 | 5/2007 | Kuan et al. |
| 7,215,475 B2 | 5/2007 | Woodgate et al. |
| 7,227,567 B1 | 6/2007 | Beck et al. |
| 7,239,293 B2 | 7/2007 | Perlin et al. |
| 7,365,908 B2 | 4/2008 | Dolgoff |
| 7,375,886 B2 | 5/2008 | Lipton et al. |
| 7,410,286 B2 | 8/2008 | Travis |
| 7,430,358 B2 | 9/2008 | Qi et al. |
| 7,492,346 B2 | 2/2009 | Manabe et al. |
| 7,524,053 B2 | 4/2009 | Lipton |
| 7,528,893 B2 | 5/2009 | Schultz et al. |
| 7,545,429 B2 | 6/2009 | Travis |
| 7,614,777 B2 | 11/2009 | Koganezawa et al. |
| 7,697,735 B2 | 4/2010 | Adam et al. |
| 7,750,981 B2 | 7/2010 | Shestak et al. |
| 7,750,982 B2 | 7/2010 | Nelson et al. |
| 7,771,102 B2 | 8/2010 | Iwasaki |
| 7,798,698 B2 | 9/2010 | Segawa |
| 7,798,699 B2 | 9/2010 | Laitinen et al. |
| 7,826,668 B1 | 11/2010 | Zaklika et al. |
| 7,864,253 B2 | 1/2011 | Tajiri |
| 8,016,475 B2 | 9/2011 | Travis |
| 8,144,153 B1 * | 3/2012 | Sullivan ................. G06T 13/40 345/473 |
| 8,199,152 B2 | 6/2012 | Sullivan et al. |
| 8,223,296 B2 | 7/2012 | Lee et al. |
| 8,331,615 B2 | 12/2012 | Furukawa et al. |
| 8,390,680 B2 | 3/2013 | Perez et al. |
| 8,556,491 B2 | 10/2013 | Lee |
| 8,670,019 B2 | 3/2014 | Byers |
| 8,684,588 B2 | 4/2014 | Ajichi et al. |
| 8,760,762 B1 | 6/2014 | Kelly et al. |
| 8,824,779 B1 | 9/2014 | Smyth |
| 8,908,008 B2 | 12/2014 | Tan et al. |
| 8,926,112 B2 | 1/2015 | Uchiike et al. |
| 8,942,283 B2 | 1/2015 | Pace |
| 8,942,434 B1 | 1/2015 | Karakotsios et al. |

(56) References Cited

U.S. PATENT DOCUMENTS

| | | |
|---|---|---|
| 9,058,765 B1 | 6/2015 | Mallick et al. |
| 9,104,908 B1 | 8/2015 | Rogers et al. |
| 9,197,884 B2 | 11/2015 | Lee et al. |
| 9,224,060 B1 | 12/2015 | Ramaswamy |
| 9,224,248 B2 | 12/2015 | Ye et al. |
| 9,288,388 B2 | 3/2016 | Son et al. |
| 9,300,916 B1 | 3/2016 | Breedvelt-Schouten et al. |
| 9,325,939 B2 | 4/2016 | Schultz et al. |
| 9,338,449 B2 | 5/2016 | Rojals et al. |
| 9,378,574 B2 | 6/2016 | Kim et al. |
| 9,456,196 B2 * | 9/2016 | Kim ............. H04N 13/161 |
| 9,470,911 B2 | 10/2016 | Fonte et al. |
| 9,489,739 B2 | 11/2016 | Kruglick |
| 9,538,130 B1 | 1/2017 | Ford et al. |
| 9,552,668 B2 | 1/2017 | Yang et al. |
| 9,619,722 B2 | 4/2017 | Takeda et al. |
| 9,626,564 B2 | 4/2017 | Rao et al. |
| 9,684,953 B2 | 6/2017 | Kuster et al. |
| 9,710,955 B2 * | 7/2017 | Kobayashi ............. G06T 15/08 |
| 9,740,282 B1 | 8/2017 | McInerny |
| 9,749,581 B2 | 8/2017 | Nilsson et al. |
| 9,824,428 B2 | 11/2017 | Zhang et al. |
| 9,872,007 B2 | 1/2018 | Woodgate et al. |
| 9,986,812 B2 | 6/2018 | Yamanashi et al. |
| 10,043,088 B2 | 8/2018 | Odry et al. |
| 10,067,562 B2 | 9/2018 | Teshome et al. |
| 10,089,740 B2 * | 10/2018 | Srikanth ............. H04N 23/633 |
| 10,169,905 B2 | 1/2019 | Bhat et al. |
| 10,321,747 B2 | 6/2019 | Tamura et al. |
| 10,423,830 B2 | 9/2019 | Chalom et al. |
| 10,664,949 B2 | 5/2020 | Chalom et al. |
| 10,777,018 B2 | 9/2020 | Varady et al. |
| 10,796,480 B2 | 10/2020 | Chen et al. |
| 11,026,634 B2 | 6/2021 | Brouwer et al. |
| 2001/0001566 A1 | 5/2001 | Moseley et al. |
| 2001/0050686 A1 | 12/2001 | Allen |
| 2002/0013691 A1 | 1/2002 | Warnes |
| 2002/0018299 A1 | 2/2002 | Daniell |
| 2002/0113866 A1 | 8/2002 | Taniguchi et al. |
| 2003/0117790 A1 | 6/2003 | Lee et al. |
| 2003/0133191 A1 | 7/2003 | Morita et al. |
| 2003/0137821 A1 | 7/2003 | Gotoh et al. |
| 2003/0197779 A1 | 10/2003 | Zhang et al. |
| 2003/0218672 A1 | 11/2003 | Zhang et al. |
| 2004/0021809 A1 | 2/2004 | Sumiyoshi et al. |
| 2004/0042233 A1 | 3/2004 | Suzuki et al. |
| 2004/0046709 A1 | 3/2004 | Yoshino |
| 2004/0066480 A1 | 4/2004 | Yoshida et al. |
| 2004/0108971 A1 | 6/2004 | Waldern et al. |
| 2004/0109303 A1 | 6/2004 | Olczak |
| 2004/0135741 A1 | 7/2004 | Tomisawa et al. |
| 2004/0170011 A1 | 9/2004 | Kim et al. |
| 2004/0263968 A1 | 12/2004 | Kobayashi et al. |
| 2004/0263969 A1 | 12/2004 | Lipton et al. |
| 2005/0007753 A1 | 1/2005 | Hees et al. |
| 2005/0053274 A1 | 3/2005 | Mayer et al. |
| 2005/0094295 A1 | 5/2005 | Yamashita et al. |
| 2005/0104878 A1 | 5/2005 | Kaye et al. |
| 2005/0110980 A1 | 5/2005 | Maehara et al. |
| 2005/0135116 A1 | 6/2005 | Epstein et al. |
| 2005/0180167 A1 | 8/2005 | Hoelen et al. |
| 2005/0190180 A1 | 9/2005 | Jin et al. |
| 2005/0190345 A1 | 9/2005 | Dubin et al. |
| 2005/0237488 A1 | 10/2005 | Yamasaki et al. |
| 2005/0254127 A1 | 11/2005 | Evans et al. |
| 2005/0264717 A1 | 12/2005 | Chien et al. |
| 2005/0276071 A1 | 12/2005 | Sasagawa et al. |
| 2005/0280637 A1 | 12/2005 | Ikeda et al. |
| 2006/0002678 A1 | 1/2006 | Weber et al. |
| 2006/0012845 A1 | 1/2006 | Edwards |
| 2006/0056166 A1 | 3/2006 | Yeo et al. |
| 2006/0067573 A1 * | 3/2006 | Parr ............. G06V 40/169 382/154 |
| 2006/0114664 A1 | 6/2006 | Sakata et al. |
| 2006/0132423 A1 | 6/2006 | Travis |
| 2006/0139447 A1 | 6/2006 | Unkrich |
| 2006/0158729 A1 | 7/2006 | Vissenberg et al. |
| 2006/0176912 A1 | 8/2006 | Anikitchev |
| 2006/0203200 A1 | 9/2006 | Koide |
| 2006/0215129 A1 | 9/2006 | Alasaarela et al. |
| 2006/0215244 A1 | 9/2006 | Yosha et al. |
| 2006/0221642 A1 | 10/2006 | Daiku |
| 2006/0227427 A1 | 10/2006 | Dolgoff |
| 2006/0244918 A1 | 11/2006 | Cossairt et al. |
| 2006/0250580 A1 | 11/2006 | Silverstein et al. |
| 2006/0262376 A1 | 11/2006 | Mather et al. |
| 2006/0267040 A1 | 11/2006 | Baek et al. |
| 2006/0269213 A1 | 11/2006 | Hwang et al. |
| 2006/0284974 A1 | 12/2006 | Lipton et al. |
| 2006/0291053 A1 | 12/2006 | Robinson et al. |
| 2006/0291243 A1 | 12/2006 | Niioka et al. |
| 2007/0008406 A1 | 1/2007 | Shestak et al. |
| 2007/0013624 A1 | 1/2007 | Bourhill |
| 2007/0019882 A1 | 1/2007 | Tanaka et al. |
| 2007/0025680 A1 | 2/2007 | Winston et al. |
| 2007/0035706 A1 | 2/2007 | Margulis |
| 2007/0035829 A1 | 2/2007 | Woodgate et al. |
| 2007/0035964 A1 | 2/2007 | Olczak |
| 2007/0081110 A1 | 4/2007 | Lee |
| 2007/0085105 A1 | 4/2007 | Beeson et al. |
| 2007/0109400 A1 | 5/2007 | Woodgate et al. |
| 2007/0109401 A1 | 5/2007 | Lipton et al. |
| 2007/0115551 A1 | 5/2007 | Spilman et al. |
| 2007/0115552 A1 | 5/2007 | Robinson et al. |
| 2007/0153160 A1 | 7/2007 | Lee et al. |
| 2007/0188667 A1 | 8/2007 | Schwerdtner |
| 2007/0189701 A1 | 8/2007 | Chakmakjian et al. |
| 2007/0223252 A1 | 9/2007 | Lee et al. |
| 2007/0244606 A1 | 10/2007 | Zhang et al. |
| 2007/0279554 A1 | 12/2007 | Kowarz et al. |
| 2007/0279727 A1 | 12/2007 | Gandhi et al. |
| 2008/0043833 A1 | 2/2008 | Perera et al. |
| 2008/0055221 A1 | 3/2008 | Yabuta et al. |
| 2008/0079662 A1 | 4/2008 | Saishu et al. |
| 2008/0084519 A1 | 4/2008 | Brigham et al. |
| 2008/0128728 A1 | 6/2008 | Nemchuk et al. |
| 2008/0225205 A1 | 9/2008 | Travis |
| 2008/0259012 A1 | 10/2008 | Fergason |
| 2008/0259643 A1 | 10/2008 | Ijzerman et al. |
| 2008/0291359 A1 | 11/2008 | Miyashita |
| 2008/0297431 A1 | 12/2008 | Yuuki et al. |
| 2008/0297459 A1 | 12/2008 | Sugimoto et al. |
| 2008/0304282 A1 | 12/2008 | Mi et al. |
| 2008/0316303 A1 | 12/2008 | Chiu et al. |
| 2008/0316768 A1 | 12/2008 | Travis |
| 2009/0016057 A1 | 1/2009 | Rinko |
| 2009/0040426 A1 | 2/2009 | Mather et al. |
| 2009/0052796 A1 * | 2/2009 | Furukawa ............. G06T 7/596 382/260 |
| 2009/0067156 A1 | 3/2009 | Bonnett et al. |
| 2009/0109705 A1 | 4/2009 | Pakhchyan et al. |
| 2009/0128735 A1 | 5/2009 | Larson et al. |
| 2009/0135623 A1 | 5/2009 | Kunimochi |
| 2009/0140656 A1 | 6/2009 | Kohashikawa et al. |
| 2009/0160757 A1 | 6/2009 | Robinson |
| 2009/0167651 A1 | 7/2009 | Minaño et al. |
| 2009/0168459 A1 | 7/2009 | Holman et al. |
| 2009/0174840 A1 | 7/2009 | Lee et al. |
| 2009/0190072 A1 | 7/2009 | Nagata et al. |
| 2009/0190079 A1 | 7/2009 | Saitoh |
| 2009/0207629 A1 | 8/2009 | Fujiyama et al. |
| 2009/0225380 A1 | 9/2009 | Schwerdtner et al. |
| 2009/0244072 A1 | 10/2009 | Pugach et al. |
| 2009/0278936 A1 | 11/2009 | Pastoor et al. |
| 2009/0290203 A1 | 11/2009 | Schwerdtner |
| 2009/0315915 A1 | 12/2009 | Dunn et al. |
| 2010/0002169 A1 | 1/2010 | Kuramitsu et al. |
| 2010/0033558 A1 | 2/2010 | Horie et al. |
| 2010/0034987 A1 | 2/2010 | Fujii et al. |
| 2010/0040280 A1 | 2/2010 | McKnight |
| 2010/0053771 A1 | 3/2010 | Travis et al. |
| 2010/0053938 A1 | 3/2010 | Kim et al. |
| 2010/0091093 A1 | 4/2010 | Robinson |
| 2010/0091254 A1 | 4/2010 | Travis et al. |

(56) References Cited

U.S. PATENT DOCUMENTS

| | | |
|---|---|---|
| 2010/0103649 A1 | 4/2010 | Hamada |
| 2010/0165598 A1 | 7/2010 | Chen et al. |
| 2010/0177387 A1 | 7/2010 | Travis et al. |
| 2010/0182542 A1 | 7/2010 | Nakamoto et al. |
| 2010/0188438 A1 | 7/2010 | Kang |
| 2010/0188602 A1 | 7/2010 | Feng |
| 2010/0214135 A1 | 8/2010 | Bathiche et al. |
| 2010/0220260 A1 | 9/2010 | Sugita et al. |
| 2010/0231498 A1 | 9/2010 | Large et al. |
| 2010/0271838 A1 | 10/2010 | Yamaguchi |
| 2010/0277575 A1 | 11/2010 | Ismael et al. |
| 2010/0278480 A1 | 11/2010 | Vasylyev |
| 2010/0289870 A1 | 11/2010 | Leister |
| 2010/0295920 A1 | 11/2010 | McGowan |
| 2010/0295930 A1 | 11/2010 | Ezhov |
| 2010/0300608 A1 | 12/2010 | Emerton et al. |
| 2010/0309296 A1 | 12/2010 | Harrold et al. |
| 2010/0321953 A1 | 12/2010 | Coleman et al. |
| 2010/0328438 A1 | 12/2010 | Ohyama et al. |
| 2011/0013417 A1 | 1/2011 | Saccomanno et al. |
| 2011/0019112 A1 | 1/2011 | Dolgoff |
| 2011/0032483 A1 | 2/2011 | Hruska et al. |
| 2011/0032724 A1 | 2/2011 | Kinoshita |
| 2011/0043142 A1 | 2/2011 | Travis et al. |
| 2011/0044056 A1 | 2/2011 | Travis et al. |
| 2011/0044579 A1 | 2/2011 | Travis et al. |
| 2011/0051237 A1 | 3/2011 | Hasegawa et al. |
| 2011/0063465 A1 | 3/2011 | Nanu et al. |
| 2011/0115997 A1 | 5/2011 | Kim |
| 2011/0154266 A1 | 6/2011 | Friend et al. |
| 2011/0187635 A1 | 8/2011 | Lee et al. |
| 2011/0188120 A1 | 8/2011 | Tabirian et al. |
| 2011/0199459 A1 | 8/2011 | Barenbrug et al. |
| 2011/0199460 A1 | 8/2011 | Gallagher |
| 2011/0211142 A1 | 9/2011 | Kashiwagi et al. |
| 2011/0216266 A1 | 9/2011 | Travis |
| 2011/0221998 A1 | 9/2011 | Adachi et al. |
| 2011/0228183 A1 | 9/2011 | Hamagishi |
| 2011/0235359 A1 | 9/2011 | Liu et al. |
| 2011/0242150 A1 | 10/2011 | Song et al. |
| 2011/0242277 A1 | 10/2011 | Do et al. |
| 2011/0242298 A1 | 10/2011 | Bathiche et al. |
| 2011/0255303 A1 | 10/2011 | Nichol et al. |
| 2011/0267563 A1 | 11/2011 | Shimizu |
| 2011/0285927 A1 | 11/2011 | Schultz et al. |
| 2011/0286525 A1 | 11/2011 | Kamisli et al. |
| 2011/0292321 A1 | 12/2011 | Travis et al. |
| 2011/0305374 A1 | 12/2011 | Chou |
| 2011/0310232 A1 | 12/2011 | Wilson et al. |
| 2012/0002136 A1 | 1/2012 | Nagata et al. |
| 2012/0002295 A1 | 1/2012 | Dobschal et al. |
| 2012/0008067 A1 | 1/2012 | Mun et al. |
| 2012/0013720 A1 | 1/2012 | Kadowaki et al. |
| 2012/0056971 A1 | 3/2012 | Kumar et al. |
| 2012/0062991 A1 | 3/2012 | Krijn et al. |
| 2012/0063166 A1 | 3/2012 | Panagotacos et al. |
| 2012/0081920 A1 | 4/2012 | Ie et al. |
| 2012/0086776 A1 | 4/2012 | Lo |
| 2012/0092435 A1 | 4/2012 | Wohlert |
| 2012/0105486 A1 | 5/2012 | Lankford et al. |
| 2012/0106193 A1 | 5/2012 | Kim et al. |
| 2012/0114201 A1 | 5/2012 | Luisi et al. |
| 2012/0127573 A1 | 5/2012 | Robinson et al. |
| 2012/0154450 A1 | 6/2012 | Aho et al. |
| 2012/0162966 A1 | 6/2012 | Kim et al. |
| 2012/0169838 A1 | 7/2012 | Sekine |
| 2012/0206050 A1 | 8/2012 | Spero |
| 2012/0219180 A1 | 8/2012 | Mehra |
| 2012/0223956 A1 | 9/2012 | Saito et al. |
| 2012/0236133 A1* | 9/2012 | Gallagher ............... G06T 5/50 348/E13.037 |
| 2012/0243204 A1 | 9/2012 | Robinson |
| 2012/0243261 A1 | 9/2012 | Yamamoto et al. |
| 2012/0293721 A1 | 11/2012 | Ueyama |
| 2012/0314145 A1 | 12/2012 | Robinson |
| 2012/0319928 A1 | 12/2012 | Rhodes |
| 2012/0327101 A1 | 12/2012 | Blixt et al. |
| 2012/0327172 A1 | 12/2012 | El-Saban et al. |
| 2013/0070046 A1 | 3/2013 | Wolf et al. |
| 2013/0076853 A1 | 3/2013 | Diao |
| 2013/0101253 A1 | 4/2013 | Popovich et al. |
| 2013/0107340 A1 | 5/2013 | Wong et al. |
| 2013/0127861 A1 | 5/2013 | Gollier |
| 2013/0135588 A1 | 5/2013 | Popovich et al. |
| 2013/0155063 A1 | 6/2013 | Solem et al. |
| 2013/0156265 A1 | 6/2013 | Hennessy |
| 2013/0163659 A1 | 6/2013 | Sites |
| 2013/0169701 A1 | 7/2013 | Whitehead et al. |
| 2013/0230136 A1 | 9/2013 | Sakaguchi et al. |
| 2013/0235561 A1 | 9/2013 | Etienne et al. |
| 2013/0265625 A1 | 10/2013 | Fäcke et al. |
| 2013/0294684 A1 | 11/2013 | Lipton et al. |
| 2013/0307831 A1 | 11/2013 | Robinson et al. |
| 2013/0307946 A1 | 11/2013 | Robinson et al. |
| 2013/0308339 A1 | 11/2013 | Woodgate et al. |
| 2013/0321599 A1 | 12/2013 | Harrold et al. |
| 2013/0328866 A1 | 12/2013 | Woodgate et al. |
| 2013/0335821 A1 | 12/2013 | Robinson et al. |
| 2014/0002586 A1 | 1/2014 | Nourbakhsh |
| 2014/0009508 A1 | 1/2014 | Woodgate et al. |
| 2014/0016354 A1 | 1/2014 | Lee et al. |
| 2014/0016871 A1 | 1/2014 | Son et al. |
| 2014/0022619 A1 | 1/2014 | Woodgate et al. |
| 2014/0036361 A1 | 2/2014 | Woodgate et al. |
| 2014/0041205 A1 | 2/2014 | Robinson et al. |
| 2014/0043323 A1 | 2/2014 | Sumi |
| 2014/0098558 A1 | 4/2014 | Vasylyev |
| 2014/0126238 A1 | 5/2014 | Kao et al. |
| 2014/0153832 A1 | 6/2014 | Kwatra et al. |
| 2014/0240344 A1 | 8/2014 | Tomono et al. |
| 2014/0240828 A1 | 8/2014 | Robinson et al. |
| 2014/0267584 A1 | 9/2014 | Atzpadin et al. |
| 2014/0340728 A1 | 11/2014 | Taheri |
| 2014/0344718 A1 | 11/2014 | Rapaport et al. |
| 2014/0368602 A1 | 12/2014 | Woodgate et al. |
| 2015/0077526 A1 | 3/2015 | Kim et al. |
| 2015/0116212 A1 | 4/2015 | Freed et al. |
| 2015/0177447 A1 | 6/2015 | Woodgate et al. |
| 2015/0243035 A1 | 8/2015 | Narasimha et al. |
| 2015/0268479 A1 | 9/2015 | Woodgate et al. |
| 2015/0269737 A1 | 9/2015 | Lam et al. |
| 2015/0334365 A1 | 11/2015 | Tsubaki et al. |
| 2015/0339512 A1 | 11/2015 | Son et al. |
| 2016/0125227 A1 | 5/2016 | Soare et al. |
| 2016/0196465 A1 | 7/2016 | Wu et al. |
| 2016/0211001 A1 | 7/2016 | Sun et al. |
| 2016/0219258 A1 | 7/2016 | Woodgate et al. |
| 2017/0132528 A1 | 5/2017 | Aslan et al. |
| 2017/0134720 A1 | 5/2017 | Park et al. |
| 2017/0195662 A1 | 7/2017 | Sommerlade et al. |
| 2017/0354882 A1 | 12/2017 | Kono et al. |
| 2017/0364149 A1 | 12/2017 | Lu et al. |
| 2018/0035886 A1 | 2/2018 | Courtemanche et al. |
| 2018/0158246 A1 | 6/2018 | Grau et al. |

FOREIGN PATENT DOCUMENTS

| | | |
|---|---|---|
| CN | 1454329 A | 11/2003 |
| CN | 1466005 A | 1/2004 |
| CN | 1487332 A | 4/2004 |
| CN | 1696788 A | 11/2005 |
| CN | 1826553 A | 8/2006 |
| CN | 1900785 A | 1/2007 |
| CN | 1908753 A | 2/2007 |
| CN | 101029975 A | 9/2007 |
| CN | 101049028 A | 10/2007 |
| CN | 101114080 A | 1/2008 |
| CN | 101142823 A | 3/2008 |
| CN | 101266338 A | 9/2008 |
| CN | 102012742 A | 4/2011 |
| CN | 102147079 A | 8/2011 |
| CN | 103310186 A | 9/2013 |
| CN | 104951808 A | 9/2015 |
| EP | 0653891 A1 | 5/1995 |

(56) References Cited

FOREIGN PATENT DOCUMENTS

| | | |
|---|---|---|
| EP | 0830984 A2 | 3/1998 |
| EP | 0860729 A2 | 8/1998 |
| EP | 0939273 A1 | 9/1999 |
| EP | 1394593 A1 | 3/2004 |
| EP | 2219067 A1 | 8/2010 |
| EP | 2451180 A2 | 5/2012 |
| GB | 2405542 | 2/2005 |
| JP | H10142556 A | 5/1998 |
| JP | 2003215705 A | 7/2003 |
| JP | 2005181914 A | 7/2005 |
| JP | 2006010935 A | 1/2006 |
| JP | 2007094035 A | 4/2007 |
| JP | 2007109255 A | 4/2007 |
| JP | 2007273288 A | 10/2007 |
| JP | 2008204874 A | 9/2008 |
| JP | 2010160527 A | 7/2010 |
| JP | 2012060607 A | 3/2012 |
| JP | 2013015619 | 1/2013 |
| KR | 20090932304 | 12/2009 |
| KR | 20110006773 A | 1/2011 |
| KR | 20110017918 A | 2/2011 |
| KR | 20120049890 A | 5/2012 |
| RU | 2493601 C1 | 9/2013 |
| WO | 1994006249 A1 | 3/1994 |
| WO | 1995020811 A1 | 8/1995 |
| WO | 1995027915 A1 | 10/1995 |
| WO | 1998021620 A1 | 5/1998 |
| WO | 1999011074 A1 | 3/1999 |
| WO | 2001061241 A1 | 8/2001 |
| WO | 2007111436 A1 | 10/2007 |
| WO | 2011020962 A1 | 2/2011 |
| WO | 2011148366 A1 | 12/2011 |
| WO | 2012158574 A1 | 11/2012 |
| WO | 2016132148 A1 | 8/2016 |

OTHER PUBLICATIONS

Bahadur, "Liquid crystals applications and uses," World Scientific, vol. 1, pp. 178 (1990).

Beato: "Understanding Comfortable stereography", Dec. 31, 2011 (Dec. 31, 2011), XP055335952, Retrieved from the Internet: URL:http://64.17.134.112/Affonso Beato/Understanding Comfortable Stereography.html [retrieved-on Jan. 17, 2017].

Braverman: "The 3D Toolbox : News", Aug. 13, 2010 (Aug. 13, 2010), XP055336081, Retrieved from the Internet: URL:http://www.dashwood3d.com/blog/the-3d-toolbox/ [retrieved on Jan. 17, 2017].

Bucila et al., "Model compression", Proceedings of the Twelfth ACM SIGKDD International Conference on Knowledge Discovery and Data Mining: Aug. 20-23, 2006, Philadelphia, PA USA, New York, NY: ACM Press, 2 Penn Plaza, Suite 701 New York, NY 10121-0701 USA, Aug. 20, 2006 (Aug. 20, 2006), pp. 535-541.

Cao et al., "Real-Time High-Fidelity Facial Performance Capture." ACM Transactions on Graphics (SIGGRAPH 2015).

Cao et al., "Realtime Multi-Person 2D Pose Estimation using Part Affinity Fields." IEEE/CVPR 2017.

Chi et al., "Hybrid Particle and Kalman Filtering for Pupil Tracking in Active IR Illumination Gaze Tracking System", Hindawi Publishing Corporation, vol. 2014, Article ID 426234, 17 pages, 2014.

Chou et al., "Face-off: Automatic Alteration of Facial Features", Department of Information Management National Taiwan University of Science and Technology, pp. 1-16, 2012.

CN-201680028919.9—Notification of the 1st Office Action dated Nov. 4, 2020 of China Patent Office.

CN-201780006239.1—Notification of the 1st Office Action dated Sep. 30, 2020 of China Patent Office.

Cootes et al., "Active Appearance Models", IEEE Trans. Pattern Analysis and Machine Intelligence, 23(6):681-685, 2001.

Cootes et al., "Active Shape Models—Their Training and Application" Computer Vision and Image Understanding 61(1):38-59 Jan. 1995.

Dalal et al., "Histogram of Oriented Gradients for Human Detection", Computer Vision and Pattern Recognition, pp. 886-893, 2005.

Drucker et al., "Support Vector Regression Machines", Advances in Neural Information Processing Systems 9, pp. 155-161, NIPS 1996.

Ekman et al., "Facial Action Coding System: A Technique for the Measurement of Facial Movement.", Consulting Psychologists Press, Palo Alto, 1978.

EP-17736268.8 European Extended Search Report of European Patent Office dated Jul. 12, 2019.

EP-18844651.2 European Partial Search Report of European Patent Office dated May 3, 2021.

Funes-Mora et al., "Gaze Estimation in the 3D Space Using RGB-D Sensors", Idiap Research Institute, Switzerland, pp. 1-23, Nov. 13, 2015.

Ganin et al., "DeepWarp: Photorealistic Image Resynthesis for Gaze Manipulation", Jul. 25, 2016, XP055295123, Retrieved from Internet: URL: http://arxiv.org/pdf/1607.07215v2.pdf (retreived on Jan. 10, 2018].

Giger et al., "Gaze Correction with a Single Webcam", Proceedings of IEEE ICME 2014 (Chengdu, China, Jul. 14-18, 2014).

Guo et al., "Automatic landmark annotation and dense correspondence registration for 3D human facial images", BMC Bioformatics 2013, 14:232, pp. 1-12, 2013.

Hinton et al., "Distilling the Knowledge in a Neural Network", CORR (ARXIV), vol. 1503.02531v1, Mar. 9, 2015 (Mar. 9, 2015), pp. 1-9.

Ho, "Random Decision Forests", Proceedings of the 3rd International Conference on Document Analysis and Recognition, Montreal, QC, pp. 278-282, Aug. 14-16, 1995.

Hu et al., A hierarchical dense deformable model for 3D face reconstruction form skull, Article in Multimedia Tools and Applications, Springer Science + Business Media, vol. 64: pp. 345-364, May 2013.

Ian Sexton et al: "Stereoscopic and autostereoscopic display-systems"—IEEE Signal Processing Magazine, May 1, 1999 (May 1, 1999 ), pp. 85-99, XP055305471, Retrieved from the Internet: RL:http://ieeexplore.IEEE.org/iel5/79/16655/00768575.pdf [retrieved on Sep. 26, 2016].

International Preliminary Report on Patentability dated Sep. 26, 2017 in International Patent Application No. PCT/RU2016/000118.

International Search Report and Written Opinion dated Apr. 18, 2017 in International Patent Application No. PCT/US17/12203.

International Search Report and Written Opinion dated Aug. 25, 2016 in International Patent Application No. PCT/RU2016/000118.

International Search Report and Written Opinion dated Oct. 16, 2018 in International Patent Application No. PCT/US18/45648.

International search report and written opinion of international searching authority for PCT application PCT/US2018/045648 dated Oct. 16, 2018.

Jain et al., "Learning Human Pose Estimation Features with Convolutional Networks", arXiv:1312.7302v6, [cs.CV], pp. 1-11, Apr. 23, 2014.

Kalantar, et al. "Backlight Unit With Double Surface Light Emission," J. Soc. Inf. Display, vol. 12, Issue 4, pp. 379-387 (Dec. 2004).

Kang et al., "Combining random forest with multi-block local binary pattern feature selection for multiclass head pose estimation", The Department of Electronics Engineering, Ewha W. University, Seoul, Republic of Korea, PLOS ONE, pp. 1-24, Jul. 17, 2017.

Katsigiannis et al., "A GPU based real-time video compression method for video conferencing", 2013 18th International Conference on Digital Signal Processing (DSP), IEEE, Jul. 2013 (Jul. 2013), pp. 1-6.

Kisku et al., "Multithread Face Recognition in Cloud", Hindawi Publishing Corporation, Journal of Sensors, vol. 2016, Article ID 2575904, 21 pages, 2016.

Kononenko et al., "Learning to Look Up: Realtime Monocular Gaze Correction Using Machine Learning", Computer Vision and Pattern Recognition, pp. 4667-4675, 2015.

Languy et al., "Performance comparison of four kinds of flat nonimaging Fresnel lenses made of polycarbonates and polymethyl methacrylate for concentrated photovoltaics", Optics Letters, 36, pp. 2743-2745.

(56) References Cited

OTHER PUBLICATIONS

Lin et al., "Real-time eye-gaze estimation using a low-resolution webcam", Springer Science + Business Media, LLC, Multimed Tools Appln (2013) 65:543-568, published online Aug. 14, 2012.
Lipton, "Stereographics: Developers' Handbook", Stereographic Developers Handbook, Jan. 1, 1997, XP002239311, p. 42-49.
Lipton: "Stereoscopic Composition Lenny Lipton", Feb. 15, 2009 (Feb. 15, 2009), XP055335930, Retrieved from the Internet: URL:https://lennylipton.wordpress.com/2009/02/15/stereoscopic-composition/ [retrieved on Jan. 17, 2017].
Lowe, "Distinctive Image Features from Scale-Invariant Keypoints", International Journal of Computer Vision 60 (2), pp. 91-110, 2004.
Lucio et al: "RGBD Camera Effects", Aug. 1, 2012 (Aug. 1, 2012), XP055335831, SIBGRAPI—Conference on Graphics, Patterns and Images Retrieved from the Internet: URL:https://www.researchgate.net/profile/Leandro Cruz/publication/233398182 RGBD Camera Effects/links/0912f50a2922010eb2000000.pdf [retrieved on Jan. 17, 2017].
Luo et al., "Face Location in Wavelet-Based Video Compression for High Perceptual Quality Videoconferencing", IEEE Transactions on Circuits and Systems for Video Technology, Institute of Electrical and Electronics Engineers, US, vol. 6, No. 4, Aug. 1996(Aug. 1996).
Marjanovic, M.,"Interlace, Interleave, and Field Dominance," http://www.mir.com/DMG/interl.html, pp. 1-5 (2001).
Marschner et al., "Fundamentals of Computer Graphics.", A K Peters/CRC Press; 4 edition (Dec. 15, 2015).
Ozuysal et al., "Fast Keypoint recognition in Ten Lines of Code", Computer Vision and Pattern Recognition, pp. 1-8, 2007.
Patil at el., "Expression invariant face recognition using semidecimated DWT, Patch-LDSMT, feature and score level fusion", Article in Applied Intelligence, pp. 1-34, Jun. 2016.
Patil et al., "3-D face recognition: Features, databases, algorithms and challenges", Article in Artificial Intelligence Review, An International Science and Engineering Journal, ISSN 0269-2821, Springer Science + Business Media Dordrecht 2015, 52 pages, Oct. 2015.
Paysan et al. "A 3D Face Model for Pose and Illumination Invariant Face Recognition.", 6th IEEE International Conference on Advanced Video and Signal based Surveillance (AVSS) for Security, Safety and Monitoring in Smart Environments, 2009.
PCT/RU2016/000118 International Preliminary Report on Patentability dated Sep. 26, 2017.
PCT/RU2016/000118 International search report and written opinion of international searching authority dated Aug. 25, 2016.
Pisharady et al., "Pose Invariant Face Recognition Using Neuro-Biologically Inspired Features", International Journa of Future Computer and Communication, vol. 1, No. 3, pp. 316-320, Oct. 2012.
Qin et al., "Eye Gaze Correction with a Single Webcam Based on Eye-Replacement", Springer International Publishing Switzerland ISVC 2015, pp. 599-609, 2015.
Redmon et al., "YOLO9000: Better, Faster, Stronger", IEEE/CVPR, 2017.
Regenbrecht et al., "Mutual Gaze Support in Videoconferencing Reviewed", Article in Communications of the Association for Information Systems, vol. 37, Article 45, 1-27 pages, Nov. 2015.
Ren et al., "Face alignment at 3000 fps via regressing local binary features", CVPR, pp. 1685-1692, 2014.
Saffari et al., "On-line Random Forests", 3rd IEEE ICCV Workshop, On-line Computer Vision, 2009.
Sahoo et al., "Online Deep Learning: Learning Deep Neural Networks on the Fly", School of Information Systems, Singapore Management University (https://arxiv.org/abs/1711.03705), 2017, pp. 1-9.
Sang et al., "Pose-Invariant Face Recognition via RGB-D Images", Hindawi Publishing Corporation, Computational Intelligence and Neuroscience, vol. 2016, Article ID 3563758, 9 pages, 2016.
Smith et al., Gaze locking: passive eye contact detection for human-object interaction. In Proceedings of the 26th annual ACM Symposium on User interface software and technology, pp. 271-280, ACM 2013.
Sun et al., "Construction and compression of face models for multi-party videoconferencing with multi-camera", 2013 6th International Congress on Image and Signal Processing (CISP), IEEE, vol. 2, Dec. 16, 2013 (Dec. 16, 2013), pp. 948-952.
Tabiryan et al., "The Promise of Diffractive Waveplates,", Optics and Photonics News, vol. 21, Issue 3, pp. 40-45 (Mar. 2010).
Travis, et al. "Backlight for view-sequential autostereo 3D", Microsoft E&DD Applied Sciences, (date unknown), 25 pages.
Travis, et al. "Collimated light from a waveguide for a display," Optics Express, vol. 17, No. 22, pp. 19714-19719 (2009).
Ucar, "Color Face Recognition Based on Steerable Pyramid Transform and Extreme Learning Machines", Hindawi Publishing Corporation, The Scientific World Journal, vol. 2014, Article ID 628494, 15 pages, 2014.
Van Der Hoest, "Eye Contact in Leisure Video Conferencing", Master Erasmus Mundus in Color in Information and Media Technology (CIMET), Gjovik University College, Master Thesis Report, pp. 1-131, Jul. 15, 2012.
Viola and Jones, "Rapid Object Detection using a Boosted Cascade of Simple Features", pp. 1-9 CVPR 2001.
Williams S P et al., "New Computational Control Techniques and Increased Understanding for Stereo 3-D Displays", Proceedings of SPIE, SPIE, US, vol. 1256, Jan. 1, 1990, XP000565512, p. 75, 77, 79.
Wolf et al., "An Eye for an Eye: A Single Camera Gaze-Replacement Method", The Blavatnik School of Computer Science Tel-Aviv University, 1-8 pages, 2010.
Xiong et al., "Supervised descent method and its applications to face alignment", In Computer Vision Pattern Recognition (CVPR), 2013 IEEE Conference, pp. 532-539.
Yang, "Mutli-scale recognition with DAG-CNNs", ICCV 2015.
Yim et al., "A Gift from Knowledge Distillation: Fast Optimization, Network Minimization and Transfer Learning", 2017 IEEE Conference on Computer Vision and Pattern Recognition (CVPR), IEEE Computer Society, US, Jul. 21, 2017 (Jul. 21, 2017), pp. 7130-7138.
Yip, "Face and Eye Rectification in Video Conference Using Artificial Neural Network", IEEE International Conference on Multimedia and Expo, 2005, pp. 690-693.
Zach et al., "A Duality Based Approach for Realtime TV-L1 Optical Flow", Pattern Recognition (Proc. DAGM), 2007, pp. 214-223.
Zheng et al., "Conditional Random Fields as Recurrent Neural Networks.", International Conference on Computer Vision (ICCV), 2015.
CN-201880064948.X Notification of the 1st Office Action of the Chinese Patent Office dated Apr. 21, 2023.
Burt et al., "A Multiresolution Spline with Application to Image Mosaics", RCA David Sarnoff Research Center, ACM Transactions of Graphics, vol. 2, No. 4, Oct. 1983, pp. 217-236.
Cham et al., "Analogous View Transfer for Gaze Correction in Video Sequences", Seventh International Conference on Control, Automation Robotics and Vision (ICARCV'02), Dec. 2002, Singapore, pp. 1415-1420.
Dodge et al., "Introduction to Machine Learning and Deep Learning: A Hands-On Starter's Guide", Copyright 2017-2020 [https://deeplearningtextbook.org] Powered by GoDaddy Website Builder.
Fleet et al., "Design and Use of Linear Models for Image Motion Analysis", International Journal of Computer Vision 36(3), 171-193, 2000, 2000 Kluwer Academic Publishers, Manufactured in the Netherlands.
Gemmell et al., "Gaze Awareness for Video-Conferencing A Software Approach", IEEE Multimedia, Oct.-Dec. 2000, pp. 1-10.
Goodfellow et al., "Deep Learning", The MIT Press Cambridge, Massachusetts, London, England, 2016 Massachusetts Institute of Technology.
Hladnik, "Image Compression and Face Recognition: Two Image Processing Applications of Principal Component Analysis", International Circular of Graphic Education and Research, Issue No. 6 2013, pp. 56-61.
Ho et al., "Gaze Correction Using 3D Video Processing For Videoconferencing", School of Information and Communications, Gwangju Institute of Science and Technology (GIST), 2015 IEEE ChinaSIP 2015, pp. 496-499.

(56) References Cited

OTHER PUBLICATIONS

Jain, "Fundamentals of Digital Image Processing", Prentice Hall Information and Systems Sciences Series, Thomas Kailath, Series Edition, 1989 by Prentice-Hall, Inc. A Division of Simon & Schuster, New Jersey, USA.

Kononenko, "Learnable Warping-Based Approach to Image Re-Synthesis with Application to Gaze Redirection", doctoral thesis, Doctoral Program in Computational and Data Science and Engineering, Moscow 2017.

Liebe et al., "Computer Vision—ECCV 2016", 14th European Conference, Amsterdam, The Netherlands, Oct. 11-14, 2016, Proceedings, Part II.

Liu et al., "Optical Flow and Principal Component Analysis-Based Motion Detection in Outdoor Videos", Hindawi Publishing Corporation, EURASIP Journal on Advances in Signal Processing, vol. 2010, Article ID 680623, 6 pages.

McCutchen, "Microsoft Computer Dictionary", Fourth Edition, Published by Microsoft Press, Redmond, Washington 1999.

Murphy, "Machine Learning A Probabilistic Perspective", The MIT Press, Cambridge Massachusetts, London England, 2012 Massachusetts Institute of Technology.

Sonka et al., "Image Processing, Analysis, and Machine Vision", Fourth Edition, The University of Iowa, Iowa City, 2008 Cengage Learning, 2015.

Vetterli et al., "Waveletes and Subband Coding", 1995 by Prentice Hall PTR, A Simon and Schuster Company, New Jersey, USA.

Wolberg, "Digital Image Warping", Department of Computer Science, Columbia University, New York, IEEE Computer Society Press, Los Alamitos, California, Third Edition 1994, USA, The Institute of Electrical and Electronics Engineers, Inc.

Wood et al., :GazeDirector: Fully Articulated Eye Gaze Redirection in Video, Univ. of Cambridge, UK, arXiv:1704.08763v1 [cs.CV] Apr. 27, 2017, pp. 1-10.

Wulff et al., "Efficient Sparse-to-Dense Optical Flow Estimation using a Learned Basis and Layers", Max Planck Institute for Intelligent Systems, Tubingen, Germany, pp. 120-130.

Yang et al., "Eye Gaze Correction with Stereovision for Video-Teleconferencing", A. Heyden et al. (Eds.): ECCV 2002, LNCS 2351, pp. 479-494 2002, Springer-Verlag Berlin Heidelberg 2002.

Zitnick et al., Manipulation of Video Eye Gaze and Head Orientation for Video Teleconferencing, Technical Report MSR-TR-99-26, Microsoft Research, Microsoft Corp., Redmond, WA, Jun. 16, 1999, pp. 1-13.

* cited by examiner

GAZE CORRECTION OF MULTI-VIEW IMAGES

TECHNICAL FIELD

This application relates to the image processing of multi-view images of head, for example a stereoscopic pair of images of a head, having regard to the perceived gaze of the eyes of the head.

BACKGROUND

In many systems, stereoscopic pair of images, or more generally multi-view images, of a head may be captured in one device and displayed on a different device for viewing by an observer. One non-limiting example is a system for performing teleconferencing between two telecommunications devices. In that case, each device may capture a stereoscopic pair of images, or more generally multi-view images, of a head of the observer of that device and transmit it to the other device over a telecommunications network for display and viewing by the observer of the other device.

When a stereoscopic pair of images, or more generally multi-view images, of a head is captured and displayed, the gaze of the head in the displayed stereoscopic pair of images, or more generally multi-view images, may not be directed at the observer. This may be caused for example by the gaze of the head not being directed at the camera system used to capture the stereoscopic pair of images, for example because the user whose head is imaged is observing a display in the same device as the camera system and the camera system is offset above (or below) that display. In that case, the gaze in the displayed images will be perceived to be downwards (or upwards). The human visual system has evolved high sensitivity to gaze during social interaction, using cues gained from the relative position of the iris and white sclera of other observers. As such errors in the perceived gaze are disconcerting. For example in a system for performing teleconferencing, errors in the perceived gaze can create unnatural interactions between the users.

BRIEF SUMMARY

The present disclosure is concerned with an image processing technique for adjusting the stereoscopic pair of images, or more generally multi-view images, of a head to correct the perceived gaze.

According to a first aspect of the present disclosure, there is provided a method of adjusting multi-view images of a head to correct gaze, the method comprising: in each image of the multi-view images, identifying image patches containing the left and right eyes of the head, respectively; in respect of the image patches containing the left eyes of the head in each image of the multi-view images, and also in respect of the image patches containing the right eyes of the head in each image of the multi-view images, performing the steps of: deriving a feature vector from plural local image descriptors of the image patch in at least one image of the multi-view images; and deriving a displacement vector field representing a transformation of an image patch, using the derived feature vector to look up reference data comprising reference displacement vector fields associated with possible values of the feature vector; and adjusting each image of the multi-view images by transforming the image patches containing the left and right eyes of the head in accordance with the derived displacement vector field.

In this method, image patches containing the left and right eyes of the head are identified and transformed. To derive a displacement vector field that represents the transformation, a feature vector is derived from plural local image descriptors of the image patch in at least one image of the multi-view images and used to look up reference data comprising reference displacement vector fields associated with possible values of the feature vector. The form of the feature vector may be derived in advance from the reference data using machine learning. This method allows the gaze to be corrected, thereby reducing the disconcerting effect of incorrect gaze when the multi-view images are subsequently displayed.

Various approaches to deriving and using displacement vector fields are possible as follows.

In a first approach, displacement vector fields may be derived in respect of the image patches in each image of the multi-view images independently. This allows for correction of gaze, but there is a risk that the displacement vector fields in respect of each image may be inconsistent with each other, with the result that conflicting transformations are performed which can distort the stereoscopic effect and/or reduce the quality of the image.

However, the following alternative approaches overcome this problem.

A second possible approach is as follows. In the second approach, the plural local image descriptors used in the method are plural local image descriptors in both images of the multi-view images. In this case, the reference data comprises reference displacement vector fields for each image of the multi-view images, which reference displacement vector fields are associated with possible values of the feature vector. This allows a displacement vector field to be derived from the reference data for each image of the multi-view images. As such, the derived displacement vector fields for each image of the multi-view images are inherently consistent.

A potential downside of this second approach is that it may require the reference data to be derived from stereoscopic or more generally multi-view imagery, which may be inconvenient to derive. However, the following approaches allow the reference data to be derived from monoscopic imagery.

A third possible approach is as follows. In the third approach, the plural local image descriptors are plural local image descriptors in one image of the multi-view images, and the displacement vector fields are derived as follows. A displacement vector field representing a transformation of the image patch in said one image of the multi-view images is derived, using the derived feature vector to look up reference data comprising reference displacement vector fields associated with possible values of the feature vector. Then, a displacement vector field representing a transformation of the image patch in the other multi-view image or images is derived by transforming the derived displacement vector field representing a transformation of the image patch in said one image of the multi-view images in accordance with an estimate of the optical flow between the image patches in the one image and the other multi-view image or images.

Thus, in the third approach, the displacement vector fields derived in respect of each image are consistent, because only one displacement vector field is derived from the reference data, and the other displacement vector field is derived therefrom using a transformation in accordance with an estimate of the optical flow between the image patches in the images of the multi-view images.

A fourth possible approach is as follows. In the fourth approach, the plural local image descriptors are plural local image descriptors in both images of the multi-view images, and the displacement vector fields are derived as follows. An initial displacement vector field representing a notional transformation of a notional image patch in a notional image having a notional camera location relative to the camera locations of the images of the multi-view images, using the derived feature vector to look up reference data comprising reference displacement vector fields associated with possible values of the feature vector. Then, displacement vector fields representing a transformation of the image patches in each image of the multi-view images are derived by transforming the initial displacement vector field in accordance with an estimate of the optical flows between the notional image patches in the notional images and the image patches in the images of the multi-view images.

Thus, in the fourth approach, the displacement vector fields derived in respect of each image are consistent, because only one displacement vector field is derived from the reference data, this representing a notional transformation of a notional image patch in a notional image having a notional camera location relative to the camera locations of the images of the multi-view images. The respective displacement vector fields used to transform the two images of the multi-view images are derived therefrom using a transformation in accordance with an estimate of the optical flow between the notional image patches in the notional images and the images of the multi-view images.

A fifth possible approach is as follows. In the fifth approach, displacement vector fields in respect of the image patches in each image of the multi-view images are derived, but then a merged displacement vector field is derived therefrom and used to transform the image patches containing both the left and right eyes of the head. In this case, the displacement vector fields for each image are consistent because they are the same.

The merging may be performed in any suitable manner. For example, the merging may be a simple average or may be an average that is weighted by a confidence value associated with each derived displacement vector field. Such a confidence value may be derived during the machine learning.

According to a second aspect of the present disclosure, there is provided an apparatus configured to perform a similar method to the first aspect of the disclosure.

BRIEF DESCRIPTION OF THE DRAWINGS

Non-limitative embodiments are illustrated by way of example in the accompanying figures, in which like reference numbers indicate similar parts, and in which.

DETAILED DESCRIPTION

Figure 1:
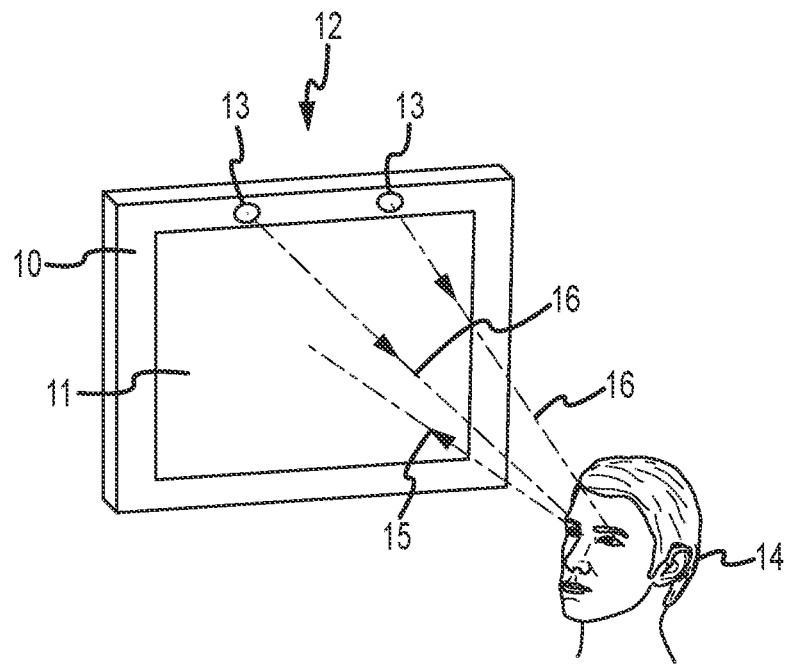
FIG. 1 is a schematic perspective view of a device that captures a stereoscopic pair of images.
Figure 2:
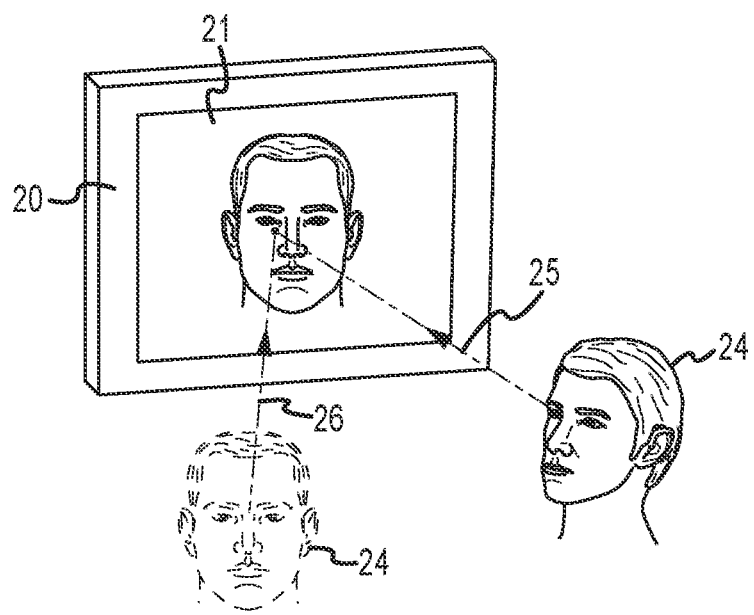
FIG. 2 is a schematic perspective view of a device that displays the stereoscopic pair of images.

FIG. 1 and FIG. 2 illustrate how incorrect gaze is perceived when a stereoscopic pair of images of a head is captured by the device 10 shown in FIG. 1 which will be referred to as the source device 10 and displayed on a different device 20 shown in FIG. 2 which will be referred to as the destination device 20.

The capture device 10 includes a display 11 and a camera system 12 comprises two cameras 13 used to capture the stereoscopic pair of images of the head of a source observer 14. The source observer 14 views the display 11, along line 15. The cameras 13 of the camera system 12 are offset from the display 11, in this case being above the display 11. Thus, the cameras 13 effectively look down on the source observer 14 along line 16.

The display device 20 includes a display 21 which is a stereoscopic display of any known type, for example an autostereoscopic display of any known type. The display 21 displays the stereoscopic pair of images is captured by the capture device 10. A destination observer 24 views the display 21. If the destination observer 24 is located in a normal viewing position perpendicular to the center of the display 21, as shown by the hard outline of the destination observer 24, then the gaze of the source observer 14 is perceived by the destination observer 24 to be downwards, rather than looking at the destination observer 24, because the cameras 13 of the source device 10 look down on the source observer 14.

Although the cameras 13 are above the display 11 in this example, the cameras 13 could in general could be in any location adjacent the display 11, and the gaze of the source observer 14 perceived by the destination observer 24 would be correspondingly incorrect.

If the destination observer 24 is located in an offset viewing position, as shown by the dotted outline of the destination observer 24 so that the destination observer 24 views the display 21 along line 26, then the offset of the destination observer 24 creates an additional error in the gaze of the source observer 14 perceived by the destination observer 24. A similar additional error in the perceived gaze of the source observer 14 occurs if the destination observer 24 is located in the normal viewing position along line 25, but the stereoscopic pair of images is displayed on the display 25 in a position offset from the center of the display 25.

A stereoscopic pair of images is an example of multi-view images where there are two images. Although FIG. 1 illustrates an example where the camera system 12 includes two cameras 13 that capture of a stereoscopic pair of images, alternatively the camera system may include more than two cameras 13 that capture more than two multi-view images, in which case similar issues of incorrect perceived gaze exist on display.

Figure 3:
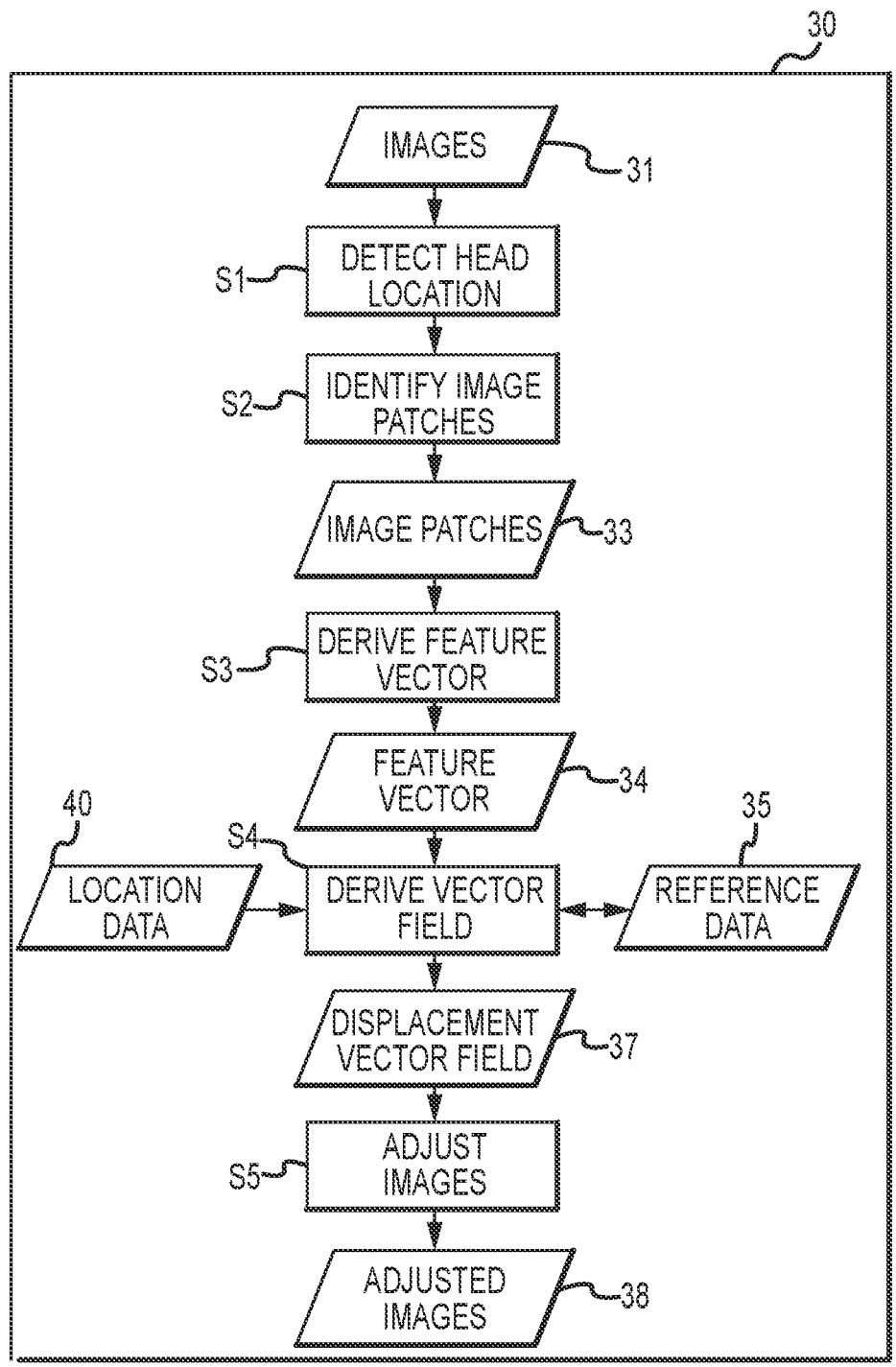
FIG. 3 is a flow chart of a method of adjusting a stereoscopic pair of images.

FIG. 3 illustrates a method of adjusting multi-view images to correct such errors in the perceived gaze. For simplicity, this method will be described with respect to the adjustment of multi-view images comprising a stereoscopic pair of images. The method may be generalized to multi-view images comprising more than two images, simply by performing the similar processing on a larger number of images.

The method may be performed in an image processor 30. The image processor 30 may be implemented by a processor executing a suitable computer program or by dedicated hardware or by some combination of software and hardware. Where a computer program is used, the computer program may comprise instructions in any suitable language and may be stored on a computer readable storage medium, which may be of any type, for example: a recording medium which is insertable into a drive of the computing system and which may store information magnetically, optically or opto-magnetically; a fixed recording medium of the computer system such as a hard drive; or a computer memory.

The image processor 30 may be provided in the source device 10, the destination device 10 or in any other device, for example a server on a telecommunications network, which may be suitable in the case that the source device 10 and the destination device 10 communicate over such a telecommunications network.

The stereoscopic pair of images 31 are captured by the camera system 12. Although the camera systems 12 is illustrated in FIG. 1 as including two cameras 13, this is not limitative and more generally the camera system 13 may have the following properties.

The camera system comprises a set of cameras 13, with at least two cameras 13. The cameras are typically spaced apart by a distance less than the average human intrapupilar distance. In the alternative that the method is applied to more than two multi-view images, then there are more than two cameras 13, that is one camera 13 image.

The cameras 13 are spatially related to each other and the display 11. The spatial relationship between the cameras 13 themselves and between the cameras 13 and the display 11 is known in advance. Known methods for finding the spatial relationship may be applied, for example a calibration method using a reference image, or specification a priori.

The cameras 13 face in the same direction as the display 11. Thus, when the source observer 14 is viewing the display 11, then the cameras 13 face the source observer 14 and the captured. stereoscopic pair of images are images of the head of the source observer 14. The cameras in the camera system can have different fields of view.

The camera system 12 may include cameras 13 having different sensing modalities, including visible light and infrared.

The main output of the camera system 13 is a stereoscopic pair of images 31 which are typically video images output at a video rate. The output of the camera system 13 may also include data representing the spatial relationship between the cameras 13 and the display 11, the nature of the sensing modalities and internal parameters of the cameras 13 (for example focal length, optical axis) which may be used for angular localization.

The method performed on the stereoscopic pair of images 31 is as follows. To illustrate the method, reference is also made to FIG. 4 which shows an example of the stereoscopic pair of images 31 at various stages of the method.

In step S1, the stereoscopic pair of images 31 are analyzed to detect the location of the head and in particular the eyes of the source observer 14 within the stereoscopic pair of images 31. This is performed by detecting presence of a head, tracking the head, and localizing the eyes of the head. Step S1 may be performed using a variety of techniques that are known in the art.

One possible technique for detecting the presence of the head is to use Haar feature cascades, for example as disclosed in Viola and Jones, "Rapid Object Detection using a Boosted Cascade of Simple Features", CVPR 2001, pp 1-9 (incorporated herein by reference).

One possible technique for tracking the head is to use the approach of Active Appearance Models to provide the position of the head of the subject, as well as the location of the eyes, for example as disclosed in Cootes et al., "Active shape models—their training and application", Computer Vision and Image Understanding, 61(1):38-59, January 1995 and in Cootes et al. "Active appearance models", IEEE Trans. Pattern Analysis and Machine Intelligence, 23(6): 681-685, 2001 (incorporated herein by reference).

In step S1, typically, a set of individual points ("landmarks") are set to regions of the face, typically the eyes, for example corners of the eye, upper and lower lid locations, etc, thereby localizing the eyes.

Figure 4:
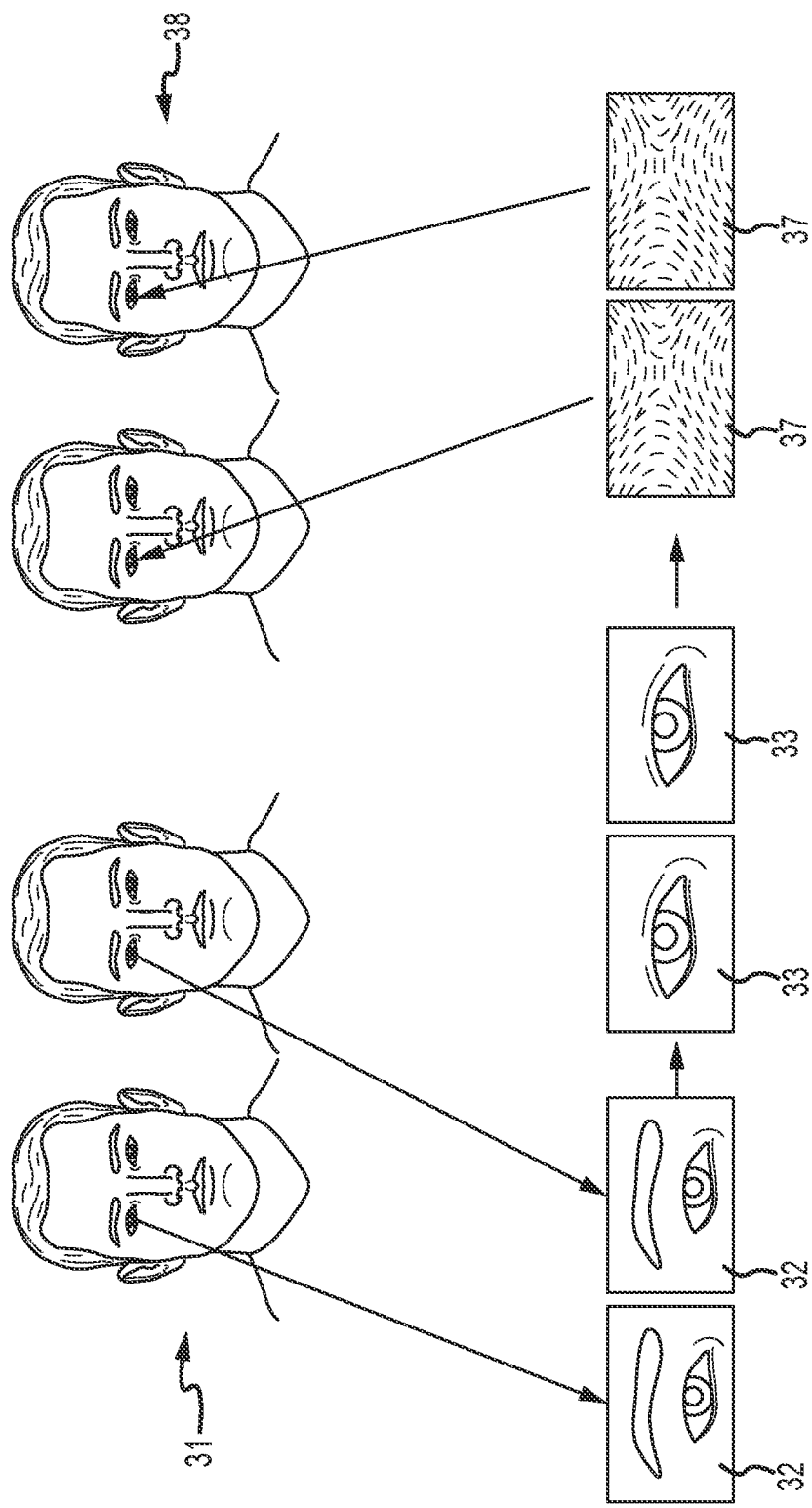
FIG. 4 is a diagram illustrating the processing of the stereoscopic pair of images in the method of FIG. 3.

In step S2, image patches containing the left and right eyes of the head, respectively are identified in each image 31 of the stereoscopic pair. FIG. 4 shows the identified image patches 32 of the right eye in each image 31 (the image patches for the left eye being omitted in FIG. 4 for clarity).

Figure 5:
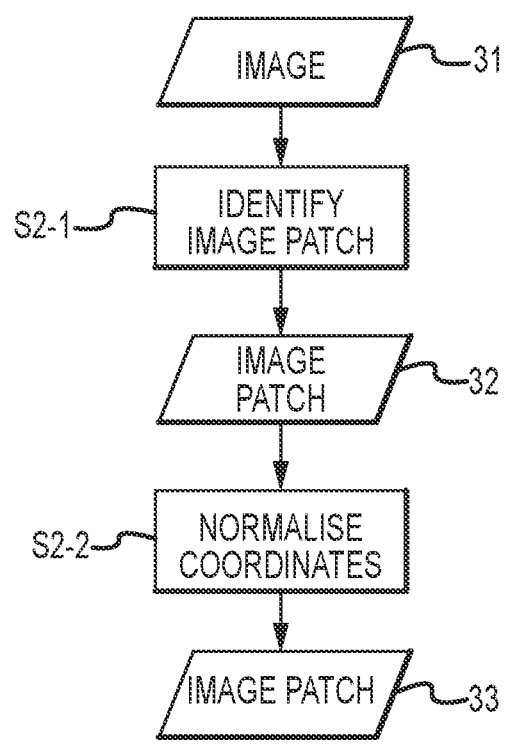
FIG. 5 is a flow chart of a step of extracting an image patch.

Step S2 may be performed as shown in FIG. 5, as follows.

In step S2-1, image patches 32 containing the left and right eyes of the head are identified in each image 31 of the stereoscopic pair. This is done by identifying an image patch 39 in each image 31 located around the identified points ("landmarks") corresponding to features of an eye, as shown for example in FIG. 4.

In step S2-2, the image patches 32 identified in step S2-1 are transformed into a normalized coordinate system, being the same normalized coordinate system as used in the machine learning process which is described further below. The transformation is chosen to align the points ("landmarks") of the eye within the image patch that were identified in step S1, with predetermined locations in the normalized coordinate system. The transformation may include translation, rotation and scaling, to appropriate extents to achieve that alignment. The output of step S2-2 is identified image patches 33 of the right eye in each image in the normalized coordinate system as shown for example in FIG. 4.

The following steps are performed separately (a) in respect of the image patches containing the left eyes of the head in each image 31 of the stereoscopic pair, and (b) in respect of the image patches containing the right eyes of the head in each image 31 of the stereoscopic pair. For brevity, the following description will refer merely to image patches and eyes without specifying the left or right eye, but noting the same steps are performed for both left and right eyes.

In step S3, a feature vector 34 is derived from plural local image descriptors of an image patch 33 in at least one image 31 of the stereoscopic pair. Depending on the approach and as described further below, this may be an image patch in a single image 31 of the stereoscopic pair or may be both images 31 of the stereoscopic pair. Thus, the local image descriptors are local image descriptors derived in the normalized coordinate system.

The feature vectors 34 are representations of the image patches 33 that are suitable for use in looking up reference data 35 comprising reference displacement vector fields that represent transformations of the image patch and are associated with possible values of the feature vector.

The reference data 35 is obtained and analyzed in advance using a machine learning technique which derives the form of the feature vectors 34 and associates the reference displacement vector fields with the possible values of the feature vector. Accordingly, the machine learning technique will now be described before reverting to the method of FIG. 3.

The training input to the machine learning technique is two sets of images, which may be stereoscopic pairs of images or monoscopic images, as discussed further below. Each set comprises images of the head of the same group of individuals but captured from cameras in different locations relative to the gaze so that the perceived gaze differs as between them.

The first set are input images, being images of each individual with an incorrect gaze where the error is known a priori. In particular, the images in the first set may be captured by at least one cameras in a known camera location where the gaze of the individual which is in a different known direction. For example in the case of the source device of FIG. 1, the camera location may be the location of a camera 13 and while the gaze of the imaged individual is towards the center of the display 11.

The second set are output images, being images of each individual with correct gaze for a predetermined observer location relative to a display location in which the image is to be displayed. In the simplest case, the observer location is a normal viewing position perpendicular to the center of the display location, for example as shown by the hard outline of the destination observer 24 in the case of the destination device 20 of FIG. 2.

For each image in the two sets, the image is analyzed to detect the location of the head and in particular the eyes using the same technique as used in step S1 described above, and then image patches containing the left and right eyes of the head, respectively, are identified using the same technique as used in step S2 described above. The following steps are then performed separately (a) in respect of the image patches containing the left eyes of the head in each image, and (b) in respect of the image patches containing the right eyes of the head in each image. For brevity, the following description will refer merely to image patches and eyes without specifying the left or right eye, but noting the same steps are performed for both left and right eyes.

Each image patch is transformed into the same normalized coordinate system as used in step S2 described above. As described above, the transformation is chosen to align points ("landmarks") of the eye with predetermined locations in the normalized coordinate system. The transformation may include translation, rotation and scaling, to appropriate extents to achieve that alignment.

Thus, the image patches input and output images of each individual are aligned in the normalized coordinate system.

From an input and output image of each individual, there is derived a displacement vector field that represents the transformation of the image patch in the input image required to obtain the image patch of the output image, for example as follows. Defining positions in the image patches by (x,y), the displacement vector field F is given by $$F=\{u(x,y),v(x,y)\}$$

where u and v define the horizontal and vertical components of the vector at each position (x,y).

The displacement vector field F is chosen so that the image patch of the output image O(x,y) is derived from the image patch of the input image I(x,y) as $$O(x,y)=I(x+u(x,y),y+v(x,y))$$

For image data from more than one camera, the system delivers a displacement vector field for the input image from each camera.

The displacement vector field F for an input and output image of an individual may be derived using a process in which a trial feature vector $F'=\{u',v'\}$ is modified to minimize error, optionally in an iterative process, for example in accordance with:

$$\Sigma |O(x,y)-I(x+u'(x,y),y+v'(x,y))|=\min!$$

By way of non-limitative example, the displacement vector field F may be derived as disclosed in Kononenko et al., "Learning To Look Up: Realtime Monocular Gaze Correction Using Machine Learning", Computer Vision and Pattern Recognition, 2015, pp. 4667-4675 (incorporated herein by reference), wherein the displacement vector field F is referred to as a "flow field".

A machine learning technique is used to obtain a map from the displacement vector field F of each individual to respective feature vectors derived from plural local image descriptors of the image patch of the input image.

The local descriptors capture relevant information of a local part of the image patch of the input image and the set of descriptors usually form a continuous vectorial output.

The local image descriptors input into the machine learning process are of types expected to provide discrimination between different individuals, although the specific local image descriptors are selected and optimized by the machine learning process itself. In general, the local image descriptors may be of any suitable type, some non-limitative examples which may be applied in any combination being as follows.

The local image descriptors may include values of individual pixels or a linear combination thereof. Such a linear combination may be, for example, a difference between the pixels at two points, a kernel derived within a mask at an arbitrary location, or a difference between two kernels at different locations.

The local image descriptors may include distances of a pixel location from the position of an eye point ("landmark").

The local image descriptors may include SIFT features (Scale-invariant feature transform features), for example as disclosed in Lowe, "Distinctive Image Features from Scale-Invariant Keypoints", International Journal of Computer Vision 60 (2), pp 91-110 (incorporated herein by reference).

The local image descriptors may include HOG features (Histogram of Oriented Gradients features), for example as disclosed in Dalal et al. "Histograms of Oriented Gradients for Human Detection", Computer Vision and Pattern Recognition, 2005, pp. 886-893 (incorporated herein by reference).

The derivation of the feature vector from plural local image descriptors depends on the type of machine learning applied.

In a first type of machine learning technique, the feature vector may comprise features that are values derived from the local image descriptors in a discrete space, being binary values or values discretized into more than two possible values. In this case, the machine learning technique associates a reference displacement vector field F derived from the training input with each possible value of the feature vector in the discrete space, so the reference data 35 is essentially a look-up table. This allows a reference displacement vector field F to be simply selected from the reference data 35 on the basis of the feature vector 34 derived in step S3, as described below.

In the case that the feature vector comprises features that are binary values derived from the local image descriptors, the feature vector has a binary representation. Such binary values may be derived in various ways from the values of descriptors, for example by comparing the value of a descriptor with a threshold, comparing the value of two descriptors, or by comparing the distance of a pixel location from the position of an eye point ("landmark").

Alternatively, the feature vector may comprise features that are discretized values of the local image descriptors. In this case, more than two discrete values of each feature are possible.

Any suitable machine learning technique may be applied, for example using a decision tree, a decision forest, a decision fern or an ensemble or combination thereof.

By way of example, a suitable machine learning technique using a feature vector comprising features that are binary values derived by comparing a set of individual pixels or a linear combination thereof against a threshold, is disclosed in Ozuysal et al. "Fast Keypoint Recognition in Ten Lines of Code", Computer Vision and Pattern Recognition, 2007, pp. 1-8 (incorporated herein by reference).

By way of further example, a suitable machine learning technique using a distance of a pixel location with the position of an eye landmark is disclosed in Kononenko et al., "Learning To Look Up: Realtime Monocular Gaze Correction Using Machine Learning", Computer Vision and Pattern Recognition, 2015, pp. 4667-4675 (incorporated herein by reference).

By way of further example, a suitable machine learning technique using a random decision forest is disclosed in Ho, "Random Decision Forests", Proceedings of the 3rd International Conference on Document Analysis and Recognition, Montreal, QC, 14-16 Aug. 1995, pp. 278-282 (incorporated herein by reference).

In a second type of machine learning technique, the feature vector may comprise features that are discrete values of the local image descriptors in a continuous space. In this case, the machine learning technique associates a reference displacement vector field F derived from the training input with possible discrete values of the feature vector in the continuous space. This allows a displacement vector field F to be derived from the reference data 35 by interpolation from the reference displacement vector fields based on the relationship between the feature vector 34 derived in step S3 and the values of the feature vector associated with the reference displacement vector fields.

Any suitable machine learning technique may be applied, for example using support vector regression.

By way of example, a suitable machine learning technique using support vector regression is disclosed in Drucker et al. "Support Vector Regression Machines", Advances in Neural Information Processing Systems 9, NIPS 1996, 155-161, (incorporated herein by reference). The output of the technique is a continuously varying set of interpolation directions that form part of the reference data 35 and are used in the interpolation.

The machine learning technique, regardless of its type, inherently also derives the form of the feature vectors 34 that is used to derive the reference displacement vector fields F. This is the form of the feature vectors 34 that is derived in step S3.

Optionally, the output of the machine learning technique may be augmented to provide confidence values associated with derivation of a displacement vector field from the reference data 35.

In the case that the feature vector comprises features that are values in a discrete space, a confidence value is derived for each reference displacement vector field.

One example of deriving a confidence value is to keep, for each resulting index (value of the feature vector) in the resulting look-up table, a distribution of the corresponding part of the input image in the training data. In this case, the confidence value may be the amount of training data that ended up with the same index, divided by the total number of training data exemplars.

Another example of deriving a confidence value is to fit a Gaussian to the distribution of input images in the training data in each bin indexed, and to use the trace of the covariance matrix around the mean value as the confidence value.

In the case that the feature vector comprises features that are discrete values of the local image descriptors in a continuous space, the confidence values may be derived according to the machine learning method used. For example, when using support vector regression, the confidence values may be the inverse of the maximum distance to the support vectors.

Where used, the confidence values are stored as part of the reference data.

The description now reverts to the method of FIG. 3.

In step S4, at least one displacement vector field 37 representing a transformation of an image patch is derived by using the feature vector 34 derived in step S3 is to look up the reference data 35. Due to the derivation of the displacement vector field 37 from the reference data 35, the transformation represented thereby corrects the gaze that will be perceived when the stereoscopic pair of images 31 are displayed.

In the case that the feature vector 34 comprises features that are values in a discrete space and the reference displacement vector fields of the reference data 35 comprise a reference displacement vector field associated with each possible value of the feature vector in the discrete space, then the displacement vector field for the image patch is derived by selecting the reference displacement field associated with the actual value of the derived feature vector 34.

In the case that the feature vector 34 comprises features that are discrete values of the local image descriptors in a continuous space, then then the displacement vector field for the image patch is derived by interpolating a displacement vector field from the reference displacement vector fields based on the relationship between the actual value of the derived feature vector 34 and the values of the feature vectors associated with the reference displacement vector fields. In the case that the machine learning technique was support vector regression, This may be done using the interpolation directions that form part of the reference data 35.

Some different approaches to the derivation of the displacement vector field 37 in step S4 will now be described.

In a first approach, in step S4, a displacement vector field 37 is derived in respect of the image patches in each image 31 of the stereoscopic pair independently. This first approach may be applied when the reference data 35 was derived from monoscopic images. This approach provides for correction of gaze, but there is a risk that the displacement vector fields 37 in respect of each image may be inconsistent with each other, with the result that conflicting transformations are subsequently performed which can distort the stereoscopic effect and/or reduce the quality of the image.

Other approaches which overcome this problem are as follows.

In a second possible approach, the plural local image descriptors used in deriving the feature vector 34 in step S3 are plural local image descriptors in both images of the stereoscopic pair. In this case, the reference data 35 similarly comprises pairs of reference displacement vector fields for each image 31 of the stereoscopic image pair, it being the pairs of reference displacement vector fields that are associated with possible values of the feature vector 34.

This second approach allows a pair of displacement vector fields 35 to be derived from the reference data 35, that is one displacement vector field for each image 31 of the stereoscopic pair. As such, the derived displacement vector fields for each image 31 of the stereoscopic pair are inherently consistent since they are derived together from the consistent pairs of reference displacement vector fields in the reference data 35.

The downside of this second approach is that it requires the reference data 35 to be derived from training input to the machine learning technique that is stereoscopic pairs of images. This does not create any technical difficulty, but may create some practical inconvenience as monoscopic imagery is more commonly available. Accordingly, the following approaches may be applied when the reference data 35 is derived from training input to the machine learning technique that is monoscopic images.

Figure 6:
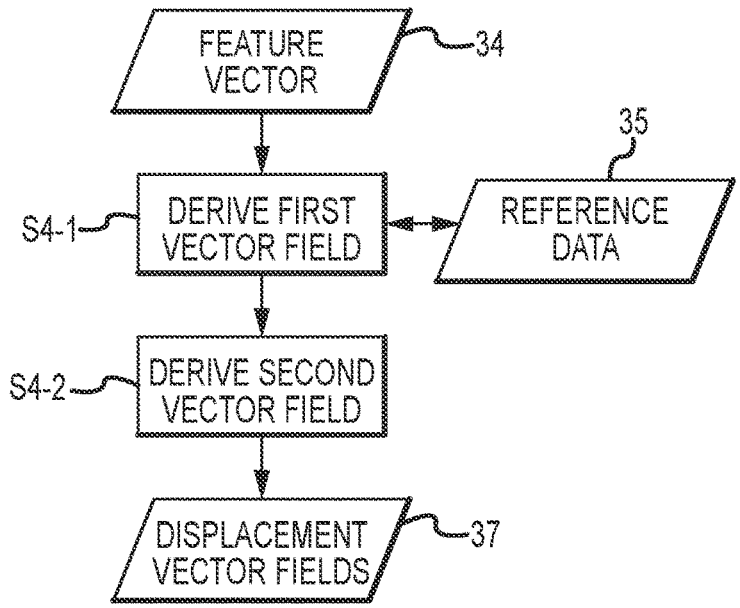
FIG. 6 and FIG. 7 are flow charts of steps of deriving displacement vector fields according to two alternative approaches.

In a third possible approach, a feature vector 34 is derived from plural local image descriptors that are plural local image descriptors derived from one image of the stereoscopic pair. In that case, the displacement vector fields 37 are derived as shown in FIG. 6 as follows.

In step S4-1, a first displacement vector field 37 representing a transformation of the image patch in said one image 31 of the stereoscopic pair (which may be either image 31) is derived. This is done using the derived feature vector 34 to look up the reference data 35.

In step S4-2, a displacement vector field 37 representing a transformation of the image patch in the other image 31 of the stereoscopic pair is derived. This is done by transforming the displacement vector field derived in step S4-1 in accordance with an estimate of the optical flow between the image patches in the images 31 of the stereoscopic pair.

The optical flow represents the effect of the different camera locations as between the images 31 of the stereoscopic pair. Such an optical flow is known in itself and may be estimated using known techniques for example as disclosed in Zach et al., "A Duality Based Approach for Realtime TV-L1 Optical Flow", Pattern Recognition (Proc. DAGM), 2007, pp. 214-223 (incorporated herein by reference).

By way of example, if the first displacement vector field 37 derived in step S4-1 is for the left image $L_o$, $L_i$ (where the subscripts o and i represent the output and input images respectively), and the optical flow to the right image $R_o$ is represented by a displacement vector field G given by $G=\{s(x,y),t(x,y)\}$ then the second displacement vector field 37 may be derived in accordance with $R_o(x,=L_o(x+s(x,y),y+t(x,y))=L_i(x+s+u(x+s,y+t,y+t+v$
$(x+s,y+t)$ Thus, in the third approach, the displacement vector fields 37 derived in respect of each image 31 of the stereoscopic pair are consistent, because only one displacement vector field is derived from the reference data 35, and the other displacement vector field is derived therefrom using a transformation which maintains consistency because it is derived in accordance with an estimate of the optical flow between the image patches in the images 31 of the stereoscopic pair.

Figure 7:
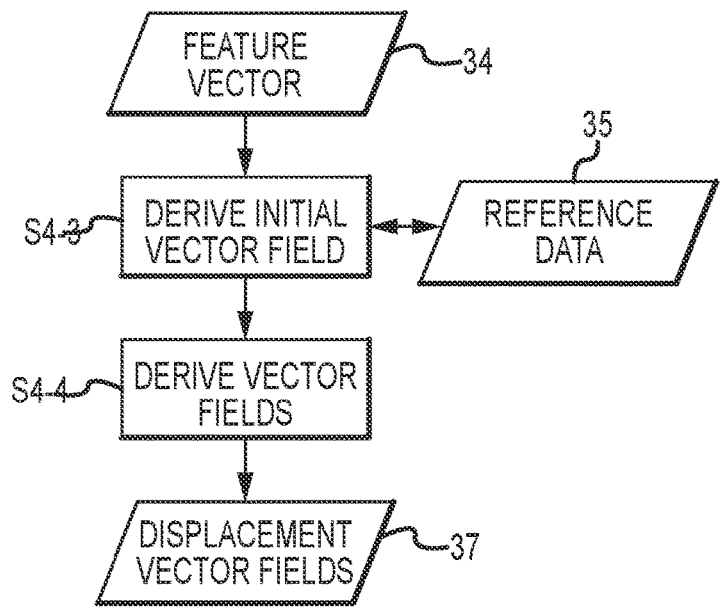

In a fourth possible approach, a feature vector 34 is derived from plural local image descriptors that are plural local image descriptors derived from both images of the stereoscopic pair. In that case, the displacement vector fields 37 are derived as shown in FIG. 7 as follows.

In step S4-3, an initial displacement vector field representing a notional transformation of a notional image patch in a notional image having a notional camera location in a predetermined location relative to the camera locations of the images 31, in this example between the camera locations of the images 31. This may be thought of as a Cyclopean eye. This is done using the derived feature vector 34 to look up the reference data 35 which comprises reference displacement vector fields associated with possible values of the feature vector. This means that the reference data 35 is correspondingly structured, but may still be derived from training input that comprises monoscopic images.

In step S4-4, a displacement vector fields 37 representing transformations of the image patches in each image 31 of the stereoscopic pair are derived. This is done by transforming the initial displacement vector field derived in step S4-3 in accordance with an estimate of the optical flow between the notional image patches in the notional images and the image patches in the images 31 of the stereoscopic pair.

The optical flow represents the effect of the different camera locations as between the notional image and the images 31 of the stereoscopic pair. Such an optical flow is known in itself and may be estimated using known techniques for example as disclosed in Zach et al., "A Duality Based Approach for Realtime TV-L1 Optical Flow", Pattern Recognition (Proc. DAGM), 2007, pp. 214-223 (as cited above and incorporated herein by reference).

By way of example, if the optical flow from the left image L to the right image R is represented by a displacement vector field G given by $G=\{s(x,y),t(x,y)\}$ then the transformation deriving the notional image C is given by $$C(x, y) = R\left(x - \frac{s(x, y)}{2}, y - \frac{t(s, y)}{2}\right) = L\left(x + \frac{s(x, y)}{2}, y + \frac{t(x, y)}{2}\right)$$

Thus, in this example, the initial displacement vector field F derived in step S4-3 for this notional image C is transformed in step S4-4 to derive the flow fields $F_{rc}$ and $F_{lc}$ for the right and left images in accordance with $$F_{rc}(x, y) = \left\{u(x, y) + \frac{s(x, y)}{2}, v(x, y) + \frac{t(x, y)}{2}\right\}$$

$$F_{lc}(x, y) = \left\{u(x, y) - \frac{s(x, y)}{2}, v(x, y) - \frac{t(x, y)}{2}\right\}$$

Thus, in the fourth approach, the displacement vector fields 37 derived in respect of each image 31 of the stereoscopic pair are consistent, because only one displacement vector field is derived from the reference data 35, this representing a notional transformation of a notional image patch in a notional image, and the displacement vector fields for the left and right images are derived therefrom using a transformation which maintains consistency because it is derived in accordance with an estimate of the optical flow between the image patches in the notional image and in the images 31 of the stereoscopic pair.

In step S5, each image 31 of the stereoscopic pair is adjusted by transforming the image patches containing the left and right eyes of the head in accordance with the derived displacement vector fields 37. This produces an adjusted stereoscopic pair of images 38 as shown in FIG. 4, in which the gaze has been corrected. In particular, the adjustment may be performed using two alternative methods, as follows.

Figure 8:
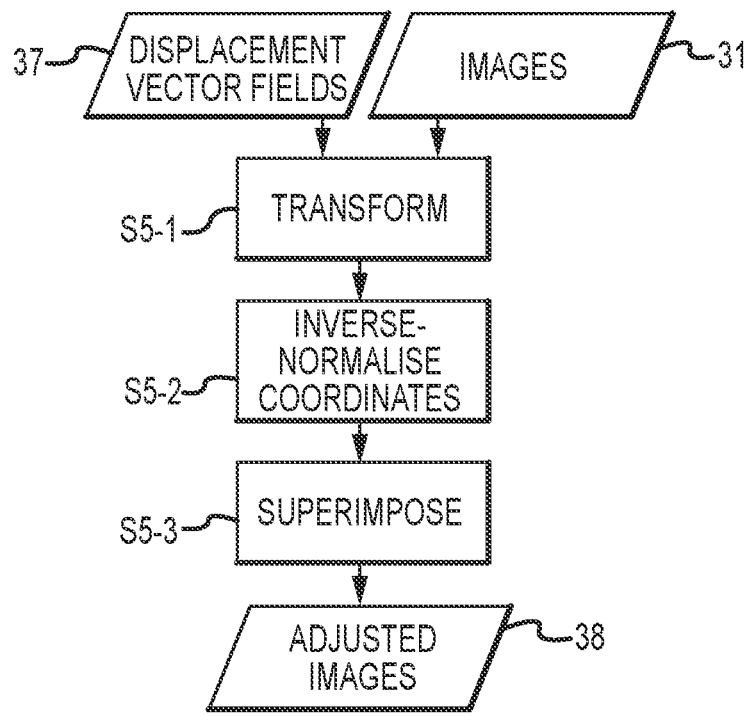
FIG. 8 and FIG. 9 are flow charts of two alternatives for a step of adjusting an image.

A first method for performing step S5 is shown in FIG. 8 and performed as follows.

In step S5-1, the image patch is transformed in the normalised coordinate system in accordance with the corresponding displacement vector field 37 in respect of the same image, thereby correcting the gaze. As described above, for a displacement vector field F the transformation of the image patch of the input image I(x,y) provides the output image O(x,y) in accordance with $$O(x,y)=I(x+u(x,y),y+v(x,y))$$

In step S5-2, the transformed image patch output from step S5-1 is transformed out of the normalised coordinate system, back into the original coordinate system of the corresponding image 31. This is done using the inverse transformation from that applied in step S2-2.

In step S5-3, the transformed image patch output from step S5-2 is superimposed on the corresponding image 31. This may be done with a full replacement within an eye region corresponding to the eye itself, and a smoothed transition between the transformed image patch and the original image 31 over a boundary region around the eye region. The width of the boundary region may be of fixed size or a percentage of the size of the image patch in the original image 31.

Figure 9:
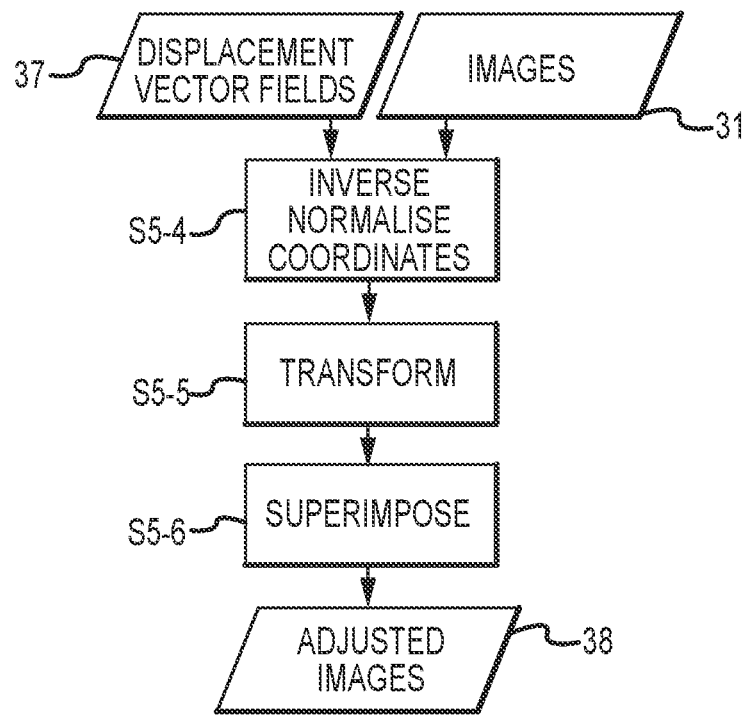

A second method for performing step S5 is shown in FIG. 9 and performed as follows.

In this second, alternative method, the transformation back into the coordinate system of the corresponding image 31 occurs before the transformation of the image patch in accordance with the transformed displacement vector field F.

In step S5-4, the displacement vector field F is transformed out of the normalised coordinate system, back into the original coordinate system of the corresponding image 31. This is done using the inverse transformation from that applied in step S2-2.

In step S5-5, the image patch 32 in the coordinate system of the image 31 is transformed in accordance with the displacement vector field F that has been transformed into the same coordinate system in step S5-4. As described above, for a displacement vector field F the transformation of the image patch of the input image I(x,y) provides the output image O(x,y) in accordance with $$O(x,y)=I(x+u(x,y),y+v(x,y))$$

but this is now performed in the coordinate system of the original image 31.

Step S5-6 is the same as S5-3. Thus, in step S5-6, the transformed image patch output from step S5-5 is superimposed on the corresponding image 31. This may be done with a full replacement within an eye region corresponding to the eye itself, and a smoothed transition between the transformed image patch and the original image 31 over a boundary region around the eye region. The width of the boundary region may be of fixed size or a percentage of the size of the image patch in the original image 31.

The displacement vector fields 37 used in step S5 will now be discussed.

One option is that the displacement vector fields 37 derived in step S4 in respect of the left and right images are used directly in step S5. That is, the image patch in respect of each image 31 of the stereoscopic patch is transformed in accordance with the displacement vector field 37 in respect of that image 31. This is appropriate if the displacement vector fields 37 are sufficiently accurate, for example because they have been derived from reference data 35 that is itself derived from stereoscopic imagery in accordance with the second approach described above.

Figure 10:
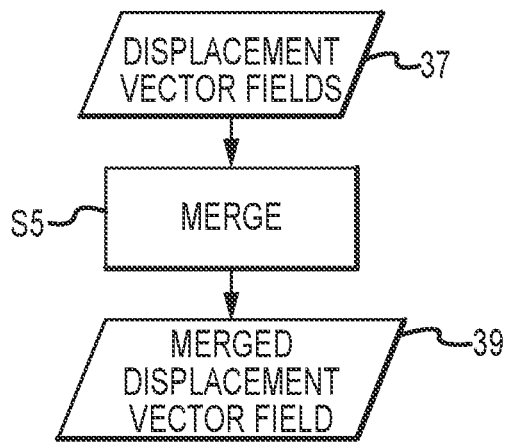
FIG. 10 is a flow chart of a transformation step within the step of adjusting an image in the methods shown in FIG. 8 and FIG. 9.

An alternative option in accordance with a fifth approach is that a merged displacement vector field 39 is derived and used. This may be applied in combination with any of the first to fourth approaches discussed above. In this case, step S5 additionally includes step S5-a as shown in FIG. 10 which is performed before step S5-1 in the first method of FIG. 8 or before step S5-4 in the second method of FIG. 9. In step S5-a, a merged displacement vector field 39 is derived from the displacement vector fields 37 derived in step S4 in respect of the image patches in each image 31 of the stereoscopic pair.

The rest of step S5 is then performed using the merged displacement vector field 39 in respect of each image 31. That is, in the first method of FIG. 8, the image patch 33 in respect of each image 31 of the stereoscopic pair is transformed in step S5-1 of in accordance with the merged displacement vector field 39. Similarly, in the second method of FIG. 9, in step S5-4 the merged displacement vector field 39 is transformed and in step S5-5 the image patch 33 in respect of each image 31 of the stereoscopic pair is transformed in accordance with that merged displacement vector field 39.

In this case, the displacement vector fields for each image are consistent because they are the same.

The merging in step S5-1a may be performed in any suitable manner.

In one example, the merging in step S5-1a may be a simple average of the displacement vector fields 37 derived in step S4

In another example, the merging in step S5-1a may be an average that is weighted by a confidence value associated with each derived displacement vector field 37. In this case, confidence values form part of the reference data 35, in the manner described above, and in step S4 the confidence values are derived from the reference data 35, together with the derived displacement vector field 37.

By way of example, denoting the derived displacement vector field 37 as $F_i$, the merged displacement vector field 39 as $F_{avg}$, and the confidence values as $a_i$, then the merged displacement vector field 39 may be derived as $$F_{avg} = \frac{\sum a_i F_i}{\sum a_i}$$

In the example described above, gaze is corrected for a destination observer 24 in an observer location that is a normal viewing position perpendicular to the center of the display location, for example as shown by the hard outline of the destination observer 24 in the case of the destination device 20 of FIG. 2. This is sufficient in many situations. However, there will now be described an optional modification which allows gaze is corrected for a destination observer 24 in a different observer location, for example as shown by the dotted outline of the destination observer 24 in the case of the destination device 20 of FIG. 2.

In this case, the method further comprises using location data 40 representing the observer location relative to a display location of the stereoscopic pair of images 31. This location data 40 may be derived in the destination device 20, for example as described below. In that case, if the method is not performed in the destination device 20, then the location data 40 is transmitted to the device in which the method is performed.

The relative observer location may take into account the location of the observer with respect to the display 21. This may be determined using a camera system in the destination device 20 and an appropriate head tracking module to detect the location of the destination observer 24.

The relative observer location may assume that the image is displayed centrally on the display 21. Alternatively, relative observer location may take into account both the location of the observer with respect to the display 21 and the location of the image displayed on the display 21. In this case, the location of the image displayed on the display 21 may be derived from the display geometry (for example, the position and area of a display window and the size of the display 21).

To account for different observer locations, the reference data 34 comprises plural sets of reference displacement vector fields, each set being associated with different observer locations. This is achieved by the training input to the machine learning technique comprising plural second sets of output images, each second set being images of each individual with correct gaze for a respective, predetermined observer location relative to a display location in which the image is to be displayed. Thus, in step S4, the displacement vector fields 37 are derived by looking up the set of reference displacement vector fields associated with the observer location represented by the location data.

Figure 11:
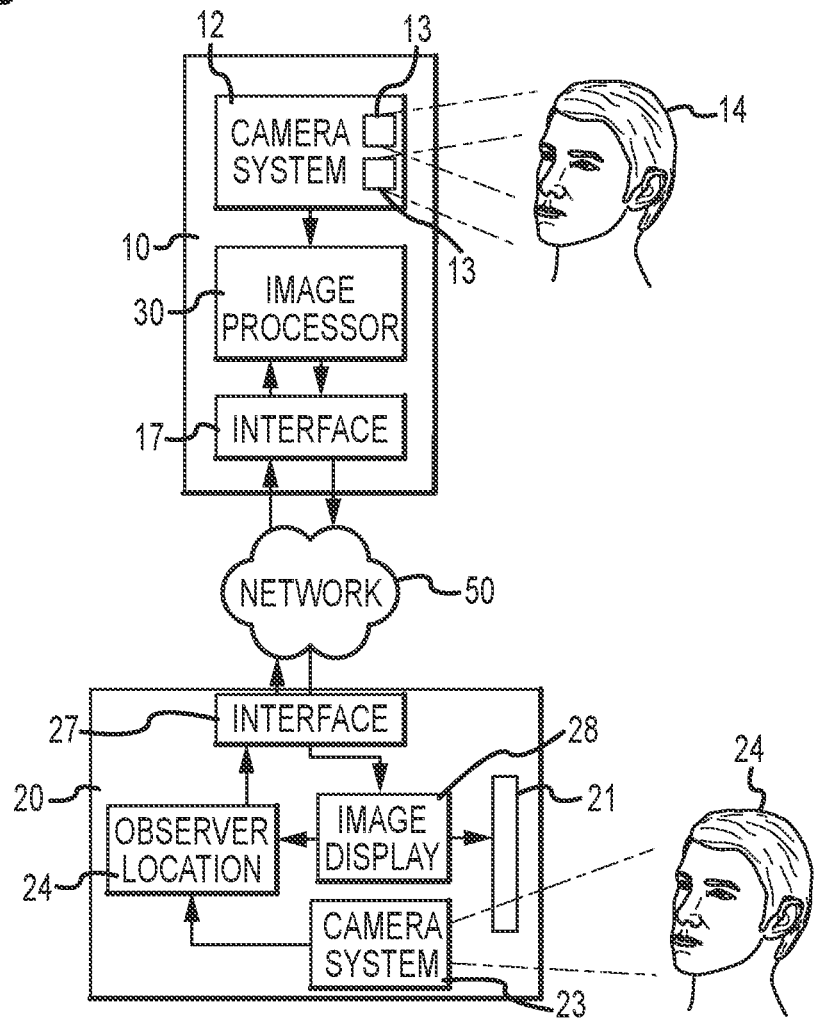
FIG. 11 is a diagram of a telecommunications system in which the method may be implemented.

As described above, the method may be implemented in an image processor 30 provided in various different devices. By way of non-limitative example, there will now be described an particular implementation in a telecommunications system which is shown in FIG. 11 and arranged as follows.

In this implementation, the source device 10 and the destination device 10 communicate over such a telecommunications network 50. For communication over the telecommunications network 50, the source device 10 includes a telecommunications interface 17 and the destination device 20 includes a telecommunications interface 27.

In this implementation, the image processor 30 is provided in the source device 10 and is provided with the stereoscopic pair of images directly from the camera system 12. The telecommunications interface 17 is arranged to transmit the adjusted stereoscopic pair of images 38 over the telecommunications network 50 to the destination device 20 for display thereon.

The destination device 20 includes an image display module 28 that controls the display 26. The adjusted stereoscopic pair of images 38 are received in the destination device 20 by the telecommunications interface 27 and supplied to the image display module 28 which causes them to be displayed on the display 26.

The following elements of the destination device 20 are optionally included in the case that the method corrects gaze for a destination observer 24 in an observer location other than a normal viewing position perpendicular to the center of the display location. In this case, the destination device 20 includes a camera system 23 and an observer location module 29. The camera system 23 captures an image of the destination observer 24. The observer location module 29 derives the location data 40. The observer location module 29 includes a head tracking module that uses the output of the camera system 23 to detect the location of the destination observer 24. The observer location module 29. Where the relative observer location also takes into account the location of the image displayed on the display 21, the observer location module 29 obtains the location of the image displayed on the display 21 from the image display module 28. The telecommunications interface 17 is arranged to transmit the location data 40 over the telecommunications network 50 to the source device 10 for use thereby.

Although the above description refers to a method applied to images supplied from a source device 10 to a destination device 20, the method may equally be applied to images supplied from in the opposite direction from the destination device 20 to the source device 10, in which case the destination device 20 effectively becomes the "source device" and the source device 10 effectively becomes the "destination device". Where images are supplied bi-directionally, the labels "source" and "destination" may be applied to both devices, depending on the direction of communication being considered.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A method of adjusting multi-view images of a head to correct gaze, the method comprising:
for each image, using a processor to identify image patches containing the left and right eyes of the head, respectively;

in respect of the image patches containing the left eyes of the head in each image of the multi-view images, and also in respect of the image patches containing the right eyes of the head in each image of the multi-view images, using the processor to perform the steps of:

deriving a feature vector from plural local image descriptors of the image patch in at least one image of the multi-view images; and deriving a displacement vector field representing a transformation of an image patch, using the derived feature vector to look up reference data comprising reference displacement vector fields associated with possible values of the feature vector; and adjusting each image of the multi-view images by transforming the image patches containing the left and right eyes of the head in accordance with the derived displacement vector field.

2. A method according to claim 1, wherein said plural local image descriptors are plural local image descriptors in each images of the multi-view images, and said reference data comprising pairs of reference displacement vector fields for each image of the multi-view images, which pairs of reference displacement vector fields are associated with possible values of the feature vector.

3. A method according to claim 1, wherein said plural local image descriptors are plural local image descriptors in one image of the multi-view images, said step of deriving displacement vector fields comprises:

deriving a displacement vector field representing a transformation of the image patch in said one image of the multi-view images, using the derived feature vector to look up reference data comprising reference displacement vector fields associated with possible values of the feature vector; and deriving a displacement vector field representing a transformation of the image patch in the other multi-view image or images by transforming the derived displacement vector field representing a transformation of the image patch in said one image of the multi-view images in accordance with an estimate of the optical flow between the image patches in said one image of the multi-view images and the other multi-view image or images.

4. A method according to claim 1, wherein said plural local image descriptors are plural local image descriptors in both images of the stereoscopic pair, said step of deriving displacement vector fields comprises:

deriving an initial displacement vector field representing a notional transformation of a notional image patch in a notional image having a notional camera location relative to the camera locations of the multi-view images, using the derived feature vector to look up reference data comprising reference displacement vector fields associated with possible values of the feature vector; and deriving displacement vector fields representing a transformation of the image patches in each image of the multi-view images by transforming the initial displacement vector field in accordance with an estimate of the optical flows between the notional image patches in the notional images and the image patches in the images of the multi-view images.

5. A method according to claim 4, wherein the multi-view images are a stereoscopic pair of images and the notional camera location is between the camera locations of the images of the stereoscopic pair.

6. A method according to claim 1, wherein the step of deriving a displacement vector field comprises deriving displacement vector fields in respect of the image patches in each image of the multi-view images, and the step of transforming the image patches containing the left and right eyes of the head is performed in accordance with the displacement vector fields derived in respect of the image patches in each image of the multi-view images.

7. A method according to claim 1, wherein the step of deriving a displacement vector field comprises deriving displacement vector fields in respect of the image patches in each image of the multi-view images, and further deriving a merged displacement vector field from the displacement vector fields derived in respect of the image patches in each image of the multi-view images, and the step of transforming the image patches containing the left and right eyes of the head is performed in accordance with the merged displacement vector field.

8. A method according to claim 7, wherein the reference displacement vector fields are further associated with confidence values, the step of deriving displacement vector fields in respect of the image patches in each image of the multi-view images further comprises deriving a confidence value associated with each derived displacement vector field, and the merged displacement vector field is an average of the displacement vector fields derived in respect of the image patches in each image of the multi-view images weighted by the derived confidence values.

9. A method according to claim 1, wherein the method uses location data representing an observer location relative to a display location of the multi-view images, said reference data comprises plural sets of reference displacement vector fields associated with possible values of the feature vector, which sets are associated with different observer locations, and said step of deriving displacement vector fields representing a transformation of an image patch is performed using the derived feature vector to look up the set of reference displacement vector fields associated with the observer location represented by the location data.

10. A method according to claim 1, wherein the local image descriptors are local image descriptors derived in a normalized coordinate system, and the reference and derived displacement vector fields are displacement vector fields in the same normalized coordinate system.

11. A method according to claim 1, wherein the feature vector comprises features that are values derived from the local image descriptors in a discrete space, the reference displacement vector fields comprise a reference displacement vector field associated with each possible value of the feature vector in the discrete space, and the step of deriving a displacement vector field for the image patch comprises selecting the reference displacement field associated with the actual value of the derived feature vector.

12. A method according to claim 1, wherein
the feature vector comprises features that are discrete values of the local image descriptors in a continuous space, and
the step of deriving a displacement vector field for the image patch comprises interpolating a displacement vector field from the reference displacement vector fields based on the relationship between the actual value of the derived feature vector and the values of the feature vector associated with the reference displacement vector fields.

13. A method according to claim 1, wherein the multi-view images are a stereoscopic pair of images.

14. A method according to claim 1, further comprising capturing the multi-view images with an electronic device having a camera system.

15. A method according to claim 14, wherein the camera system is located in a position that is offset from a display of the electronic device.

16. A method according to claim 14, wherein capturing the multi-view images comprises capturing images using different sensing modalities.

17. A method according to claim 14, wherein capturing the multi-view images comprises capturing images using a visible light camera and an infrared camera.

18. A method according to claim 14, wherein capturing the multi-view images comprises capturing images using at least two cameras that are spaced apart by a distance less than average human interpupillary distance.

19. A method according to claim 1, further comprising using a machine learning algorithm to obtain a map from the displacement vector field of each individual to respective feature vectors derived from plural local image descriptors of the image patch.

20. A method according to claim 1, further comprising transmitting the adjusted image over a telecommunications network to a destination device for display thereon.

* * * * *